US011187968B2

(12) United States Patent
Uchida et al.

(10) Patent No.: US 11,187,968 B2
(45) Date of Patent: Nov. 30, 2021

(54) IMAGE PROJECTION DEVICE

(71) Applicant: Panasonic Intellectual Property Management Co., Ltd., Osaka (JP)

(72) Inventors: Tsuneo Uchida, Chiba (JP); Katsu Yamada, Osaka (JP)

(73) Assignee: PANASONIC INIELLECTUAL PROPERTY MANAGEMENT CO., LTD., Osaka (JP)

( * ) Notice: Subject to any disclaimer, the term of this patent is extended or adjusted under 35 U.S.C. 154(b) by 30 days.

(21) Appl. No.: 16/742,939

(22) Filed: Jan. 15, 2020

(65) Prior Publication Data

US 2020/0150516 A1    May 14, 2020

Related U.S. Application Data

(63) Continuation of application No. PCT/JP2018/033900, filed on Sep. 13, 2018.

(30) Foreign Application Priority Data

Sep. 27, 2017  (JP) ............................. JP2017-186623

(51) Int. Cl.
   *G03B 21/14*   (2006.01)
   *G03B 21/28*   (2006.01)

(52) U.S. Cl.
   CPC ........... *G03B 21/142* (2013.01); *G03B 21/28* (2013.01)

(58) Field of Classification Search
   CPC .... G03B 21/14; G03B 21/28; G03B 21/2066; G02B 17/08; H04N 5/74
   USPC .................................................... 353/98, 99
   See application file for complete search history.

(56) References Cited

U.S. PATENT DOCUMENTS

| 2007/0258056 | A1 | 11/2007 | Noji |
| 2009/0040473 | A1 | 2/2009 | Amano et al. |
| 2009/0066919 | A1 | 3/2009 | Fujita et al. |
| 2010/0171937 | A1 | 7/2010 | Hirata et al. |
| 2013/0100418 | A1 | 4/2013 | Yoshikawa |

(Continued)

FOREIGN PATENT DOCUMENTS

| JP | 2007-304148 | 11/2007 |
| JP | 2009-058935 | 3/2009 |

(Continued)

OTHER PUBLICATIONS

International Search Report of PCT application No. PCT/JP2018/033900 dated Nov. 20, 2018.

*Primary Examiner* — William C. Dowling
(74) *Attorney, Agent, or Firm* — McDermott Will and Emery LLP

(57) ABSTRACT

An image projection device includes an image display element that forms a projection image, a transmissive optical system that is disposed on an emission surface side of the image display element and includes a diaphragm and a plurality of lenses, and a reflection optical system that includes a first mirror reflecting light emitted from the transmissive optical system and having positive power and a second mirror that is a plane mirror for reflecting light reflected by the first mirror on a projection surface. The first mirror is disposed between the second mirror and the projection surface in a direction along an optical axis of the transmissive optical system. An intermediate image is formed between the transmissive optical system and the first mirror.

16 Claims, 13 Drawing Sheets

(56) References Cited

U.S. PATENT DOCUMENTS

| | | |
|---|---|---|
| 2013/0229633 A1 | 9/2013 | Hirata et al. |
| 2014/0146294 A1 | 5/2014 | Hirata et al. |
| 2014/0218702 A1 | 8/2014 | Yasui et al. |
| 2020/0019051 A1* | 1/2020 | Uchida .................. G02B 13/18 |

FOREIGN PATENT DOCUMENTS

| | | |
|---|---|---|
| JP | 2010-160296 | 7/2010 |
| JP | 2012-168482 | 9/2012 |
| JP | 2013-088727 | 5/2013 |
| JP | 2013-231978 | 11/2013 |
| JP | 2014-130233 | 7/2014 |
| JP | 2014-153478 A | 8/2014 |

* cited by examiner

FIG. 12A
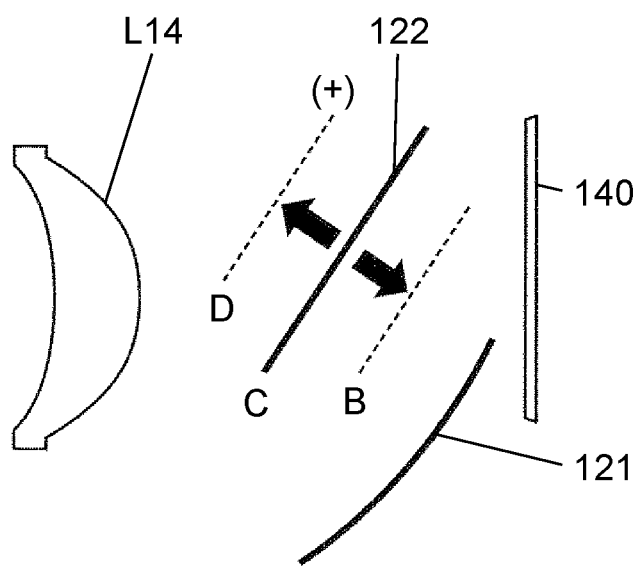
FIG. 12B  FIG. 12C  FIG. 12D
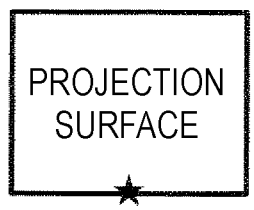
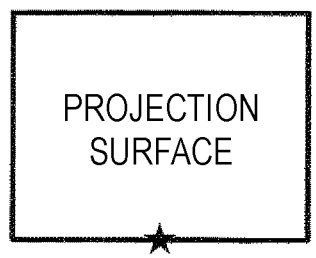
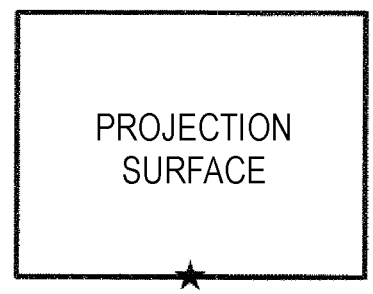

FIG. 13A
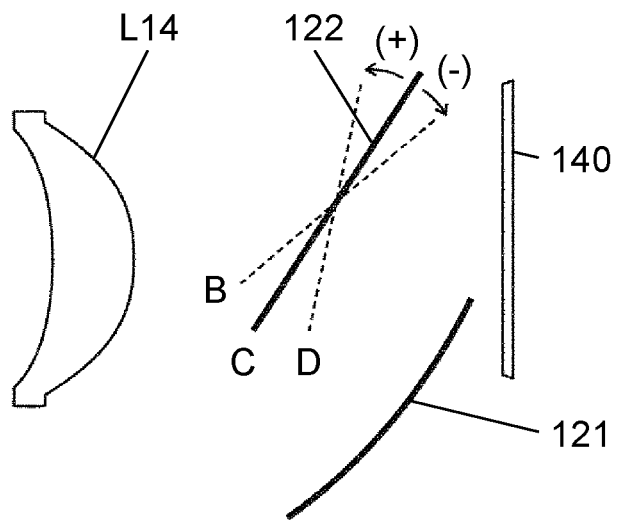
FIG. 13B  FIG. 13C  FIG. 13D
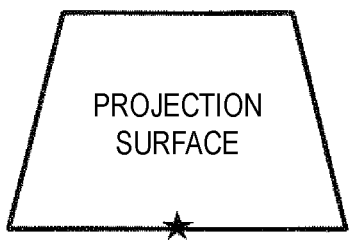 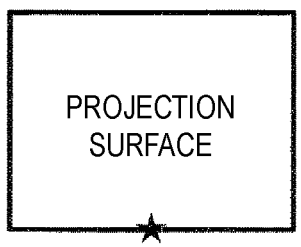 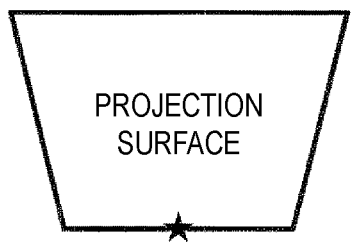
FIG. 14
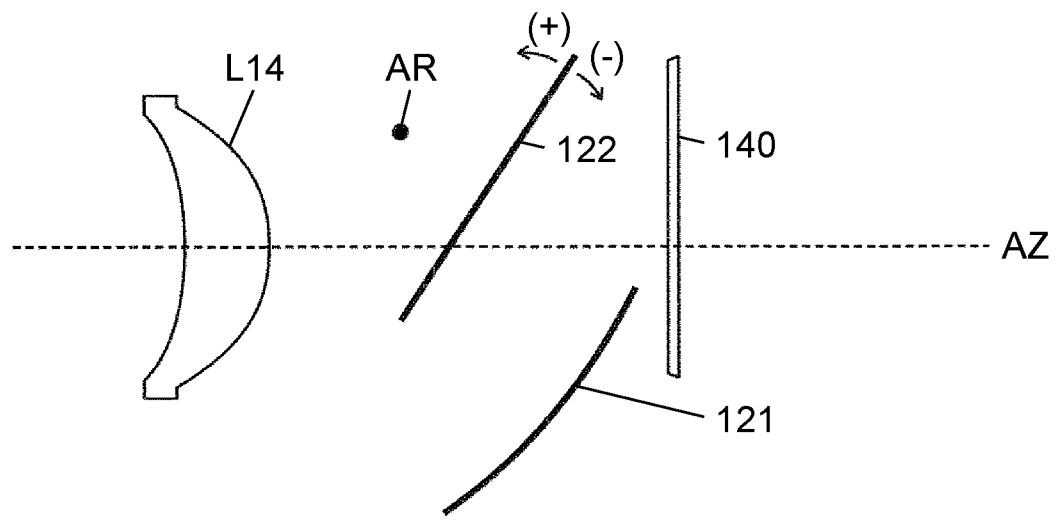

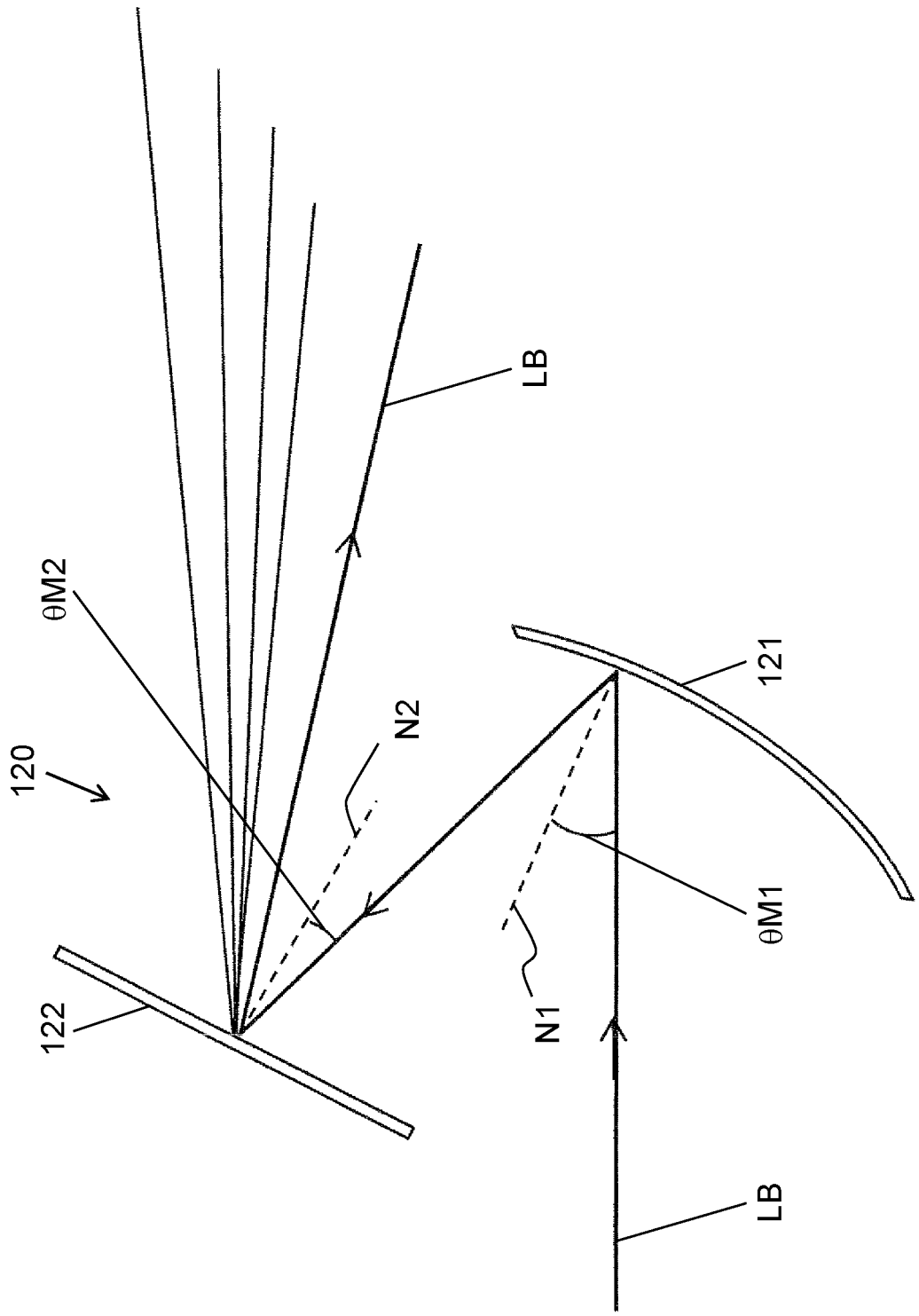

IMAGE PROJECTION DEVICE

TECHNICAL FIELD

The present disclosure relates to an image projection device that projects an image formed with an image display element.

BACKGROUND ART

PTL 1 discloses a projection device that magnifies and projects an image generated by an image generating unit onto a surface to be projected. The projection device includes an illumination system having a light source, a projection optical system, a reflection optical member, and an adjustment device. The projection optical system has a plurality of optical elements including optical elements for adjusting a focal position, the optical elements being movable along an optical axis, and emits light having been emitted from the illumination system and passed through the image generating unit as projection light. The reflection optical member is disposed on an optical path of projection light that is emitted from the projection optical system and directed to the surface to be projected, and has a reflecting surface that is at least partially flat. The adjustment device drives the reflection optical member in a predetermined direction crossing the surface to be projected while keeping the reflecting surface parallel to the surface to be projected, and according to this driving, drives the optical elements for adjusting a focal position along the optical axis, thus changing a magnification of a projection image based on an amount of change in an optical path length of the projection light and performing focusing based on the amount of change at the same time. This configuration enhances a magnification ratio and operability.

CITATION LIST

Patent Literature

PTL 1: Unexamined Japanese Patent Publication No. 2012-168482

SUMMARY

The present disclosure provides a compact image projection device.

According to one aspect of the present disclosure, there is provided an image projection device for projecting an image on a projection surface. The image projection device includes an image display element that forms a projection image, a transmissive optical system that is disposed on an emission surface side of the image display element and includes a diaphragm and a plurality of lenses, and a reflection optical system that includes a first mirror reflecting light emitted from the transmissive optical system and having positive power and a second mirror that is a plane mirror for reflecting light reflected by the first mirror on a projection surface. The first mirror is disposed between the second mirror and the projection surface in a direction along an optical axis of the transmissive optical system. An intermediate image is formed between the transmissive optical system and the first mirror.

According to the present disclosure, the intermediate image is formed between the transmissive optical system and the first mirror and thus downsizing of the image projection device can be achieved.

BRIEF DESCRIPTION OF DRAWINGS

FIG. 12A is an explanatory view of an influence of the parallel movement of the second mirror on a projection image.

FIG. 12B is an explanatory view of the influence of the parallel movement of the second mirror on the projection image.

FIG. 12C is an explanatory view of the influence of the parallel movement of the second mirror on the projection image.

FIG. 12D is an explanatory view of the influence of the parallel movement of the second mirror on the projection image.

FIG. 13A is an explanatory view of an influence of a rotational movement of the second mirror on a projection image.

FIG. 13B is an explanatory view of the influence of the rotational movement of the second mirror on the projection image.

FIG. 13C is an explanatory view of the influence of the rotational movement of the second mirror on the projection image.

FIG. 13D is an explanatory view of the influence of the rotational movement of the second mirror on the projection image.

FIG. 14 is an explanatory view of a position of a center of rotation of the second mirror.

FIG. 16 is an explanatory view of incident angles of rays on a first mirror and on the second mirror.

DESCRIPTION OF EMBODIMENTS

Exemplary embodiments will be described below in detail with reference to the drawings as appropriate. However, an unnecessarily detailed description will be omitted in some cases. For example, a detailed description of a well-known matter and a duplicated description of substantially the same configuration will be omitted in some cases. This is to avoid the following description from being unnecessarily redundant and thus to help those skilled in the art to easily understand the description.

It should be noted that the accompanying drawings and the following description are provided to help those skilled in the art fully understand the present disclosure and not intended to limit subject matters as described in the claims.

First Exemplary Embodiment

1. Configuration of Image Projection Device

Hereinafter, image projection device 10 according to an exemplary embodiment of the present disclosure will be described with reference to FIG. 1 to FIG. 5.

Figure 1:
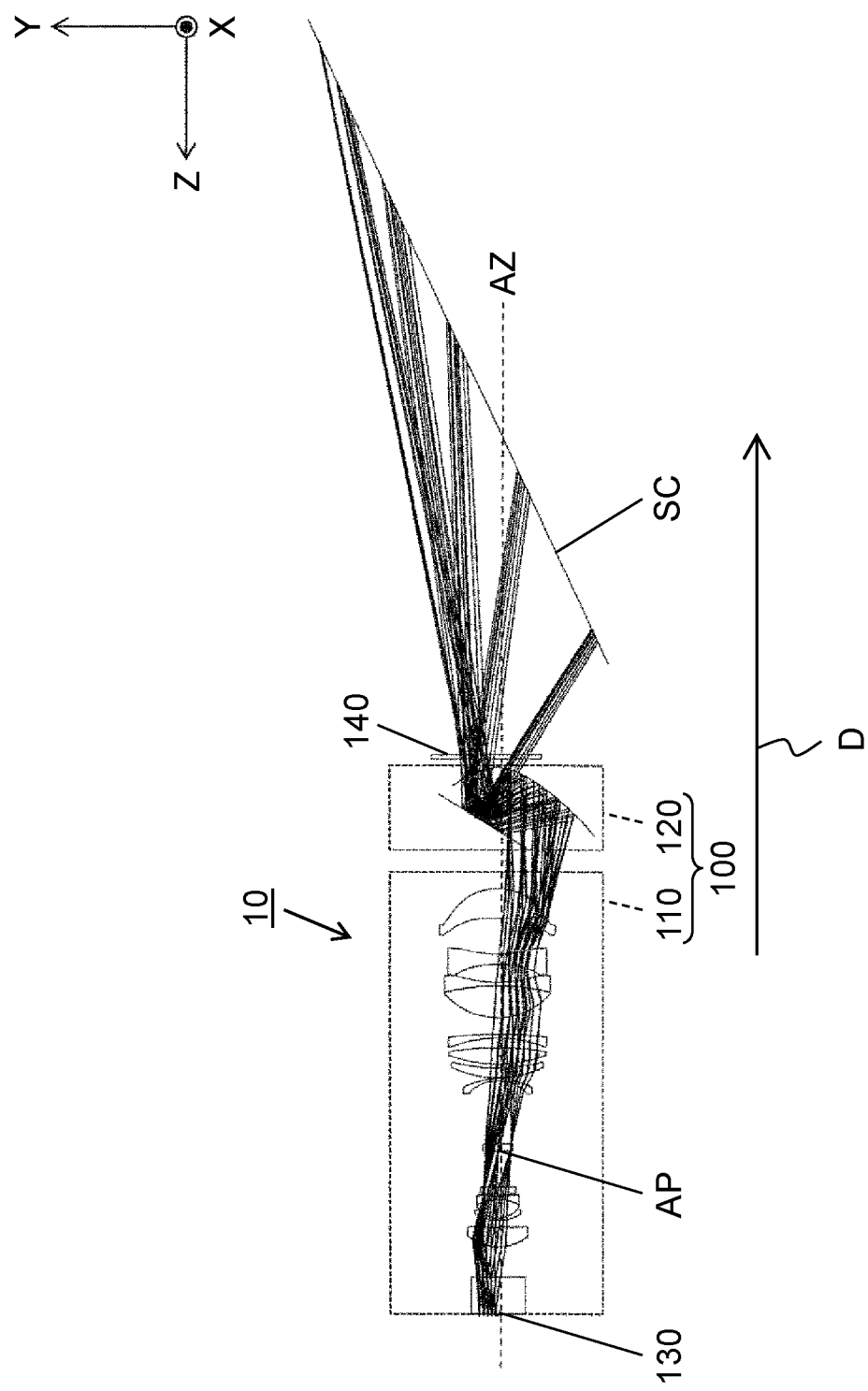
FIG. 1 is a configuration view for explaining an image projection device according to the present disclosure.

FIG. 1 is a cross-sectional configuration view for explaining an optical system of image projection device 10 according to the present disclosure. Image projection device 10 is configured with projection optical system 100, image display element 130, and transmissive element 140. Image projection device 10 projects an image formed with image display element 130 on screen SC provided in a direction not correctly facing image projection device 10 (diagonal direction). When screen SC is provided in the direction not correctly facing image projection device 10, a direction of a normal line at a point where a center of an image projected by image projection device 10 reaches on screen SC does not match a direction of an optical path of a ray passing through the center of the image among rays emitted from a final surface of projection optical system 100. In image projection device 10 according to the present disclosure, a line connecting a center of aperture diaphragm AP of transmissive optical system 110 and a center of a lens disposed to be closest to a projection side is referred to as "optical axis AZ". However, optical axis AZ may be an axis that concurrently includes the most lens centers. Alternatively, optical axis AZ may be set at an eccentric position relative to image display element 130 in a plane including an optical path of emitted light. Herein, the optical path of emitted light means an optical path of a principal ray passing from a center of a display surface of image display element 130 to a center of a magnified image on screen SC among optical paths extending from image display element 130 to screen SC.

Image projection device 10 projects an image on a predetermined region including a point at which an extended line of optical axis AZ crosses screen SC (projection surface). When image projection device 10 includes a reflecting surface such as a prism or a mirror in transmissive optical system 110, image projection device 10 projects an image on a region including a point at which an extended line of an optical axis of an optical system after the optical axis is reflected and bent by the reflecting surface crosses screen SC. When screen SC is provided in the direction not correctly facing image projection device 10, it is not necessary to project an image on the region where the extended line of optical axis AZ crosses screen SC (projection surface).

Image projection device 10 according to the present disclosure may project an image on screen SC with a curvature.

Figure 2:
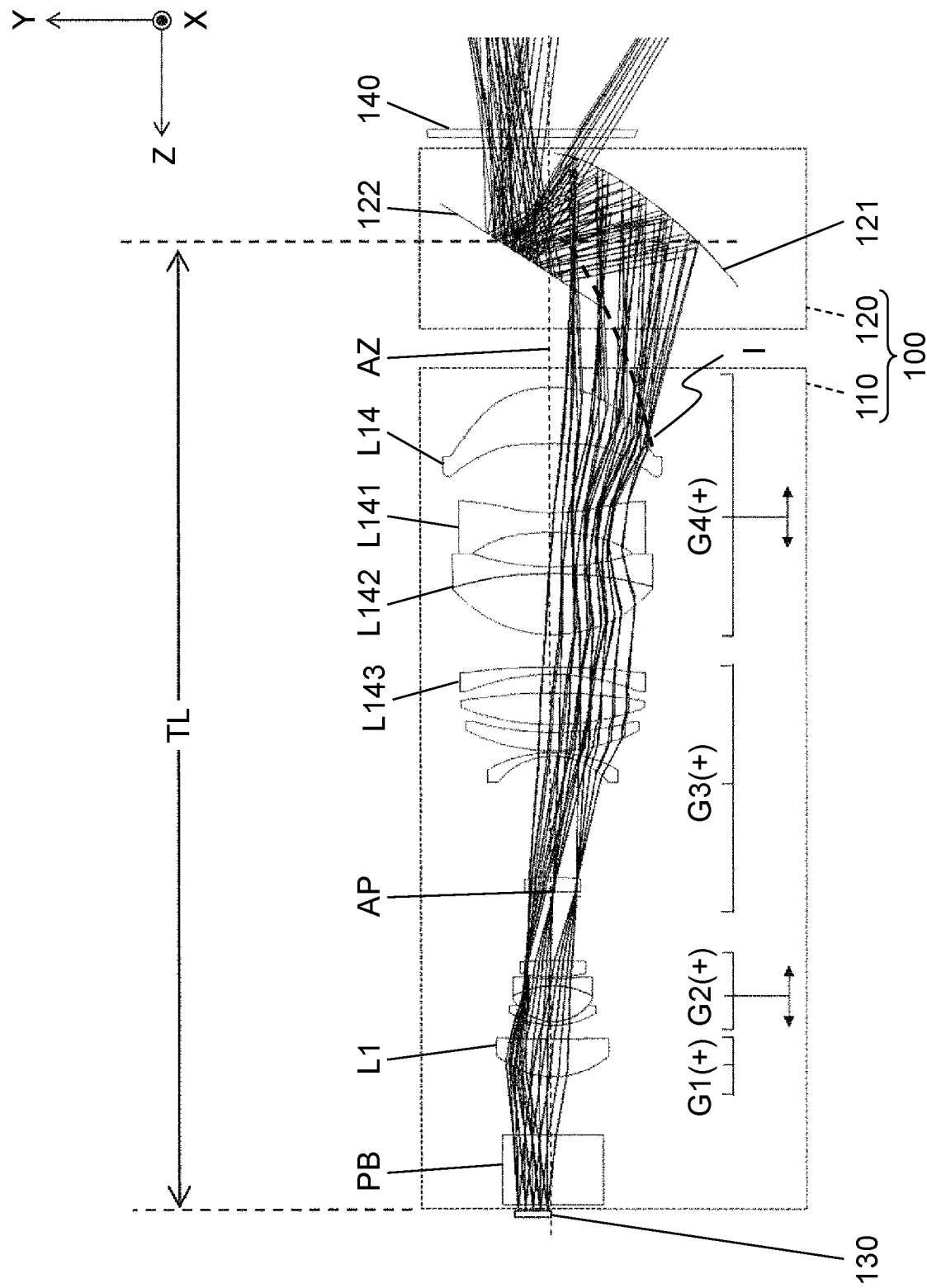
FIG. 2 is an enlarged configuration view of the image projection device according to the present disclosure.

FIG. 2 is an enlarged cross-sectional configuration view of image projection device 10 according to the present disclosure. Projection optical system 100 includes transmissive optical system 110 having positive power as a whole, and reflection optical system 120 having positive power as a whole.

Transmissive optical system 110 includes first lens group G1, second lens group G2, third lens group G3, and fourth lens group G4 in this order from image display element 130 to screen SC. First lens group G1, second lens group G2, third lens group G3, and fourth lens group G4 have positive power. Prism PB is disposed between image display element 130 and first lens group G1.

First lens group G1 is constituted by lens L1 that is a single biconvex lens.

Second lens group G2 is constituted by four lens elements.

Third lens group G3 includes aperture diaphragm AP. Third lens group G3 also includes five lens elements closer to the projection side than aperture diaphragm AP is and has positive power as a whole.

Fourth lens group G4 disposed in transmissive optical system 110 to be closest to screen SC includes lens L14 that is convex to the projection side, biconcave lens L141, and positive meniscus cemented lens L142 that is formed by cementing a negative lens and a positive lens, in this order from screen SC to image display element 130. Positive meniscus cemented lens L142 is disposed to be convex to image display element 130. In fourth lens group G4 closest to the projection side, positive meniscus lens L14 and positive meniscus cemented lens L142 are disposed such that concave surfaces of these lenses face each other.

Lens L14 is shaped to have a largest uneven thickness ratio in transmissive optical system 110. It is thus possible to increase a difference in refractive power between a light beam transmitting through a center of lens L14 and a light beam transmitting through a periphery of lens L14. This is effective for correcting field curvature.

Biconcave lens L141 that is adjacent to lens L14 on a side closer to image display element 130 has a biconcave shape. At least one surface of biconcave lens L141 preferably has an aspherical shape. Specifically, at least one surface of biconcave lens L141 has a shape whose curvature decreases as it goes away from a center of the lens in a radial direction. That is, at least one surface of biconcave lens L141 has a shape in which power of a peripheral portion of the lens is less than power of the center of the lens.

Projection optical system 100 performs focusing using second lens group G2 and fourth lens group G4. Fourth lens group G4 includes at least one surface having an aspherical shape to reduce image distortion produced upon focusing or degradation in resolution. This configuration can achieve good optical performance even when a projection distance is changed. The effect described above can be further enhanced if the lens having an aspherical shape has a meniscus shape. Specifically, fourth lens group G4 of transmissive optical system 110 includes meniscus lens L14.

Intermediate image I is formed between transmissive optical system 110 and screen SC. More specifically, intermediate image I is formed between transmissive optical system 110 and first mirror 121. A conjugate position of a ray emitted from transmissive optical system 110 is thus separated from a conjugate position of first mirror 121 disposed to be closest to screen SC. An angle of a ray incident on first mirror 121 thus becomes gentle. This is advantageous for downsizing reflection optical system 120.

Transmissive optical system 110 includes at least one or more lens elements with negative power that is disposed between aperture diaphragm AP and lens L14 (lens closest to projection side). Specifically, transmissive optical system 110 includes biconcave lens L141. Consequently, it is possible to form intermediate image I and achieve good optical performance without any distortion on screen SC while reflection optical system 120 is still downsized. The lens element with negative power preferably has a biconcave shape in view of enhancing the effect described above.

When two or more lens elements with negative power are disposed, a similar effect is expected by disposing a lens element that has a concave surface on a side closer to reflection optical system 120 and a lens element that has a concave surface on a side closer to aperture diaphragm AP. Specifically, transmissive optical system 110 includes biconcave lens L141 (first lens element) with negative power and lens L143 (second lens element) with negative power, these lenses being disposed between aperture diaphragm AP and lens L14 (lens closest to projection side). Biconcave lens L141 is disposed closer to lens L14 and has a concave shape. Lens L143 is disposed closer to aperture diaphragm AP and has a concave shape.

Reflection optical system 120 reflects a light beam emitted from transmissive optical system 110, and projects the reflected light beam on screen SC. Reflection optical system 120 is constituted by two mirrors, that is, first mirror 121 and second mirror 122. First mirror 121 includes a reflecting surface that has a concave free curved surface shape, and has positive power as a whole. Second mirror 122 is a plane mirror that has a plane reflecting surface. Note that reflection optical system 120 only has to include one or more mirrors, and is not limited to include two mirrors. First mirror 121 is disposed between second mirror 122 and screen SC in direction D along optical axis AZ (see FIG. 1).

Image display element 130 forms an image to be projected on screen SC based on an image signal. As image display element 130, a digital micromirror device (DMD) or a spatial modulation element such as a transmissive type or a reflective type liquid crystal panel can be used. Image display element 130 according to the present disclosure has a rectangular shape whose long side extends along an X-axis direction in FIG. 2 (direction perpendicular to sheet) and whose short side extends along a Y-axis direction. Screen SC is disposed at an angle not perpendicular to optical axis AZ such that a surface of screen SC (projection surface) is not parallel to a display surface of image display element 130.

Transmissive element 140 is disposed between second mirror 122 of reflection optical system 120 and screen SC. The light beam reflected by second mirror 122 is transmitted through transmissive element 140 to be projected on screen SC. Transmissive element 140 has a toroidal shape in which a curvature in a direction corresponding to a long-side direction of image display element 130 is different from a curvature in a direction corresponding to a short-side direction of image display element 130, and is convex to screen SC. That is, on an incident surface of transmissive element 140, a curvature in the X-axis direction (direction perpendicular to sheet of FIG. 2) corresponding to the long-side direction of image display element 130 is larger than a curvature in the Y-axis direction corresponding to the short-side direction of image display element 130.

The light beam reflected by second mirror 122 is widened and projected on screen SC so as to form a large screen on screen SC. If transmissive element 140 is formed with a plane, an incident angle on transmissive element 140 increases, and thus an amount of reflected light by transmissive element 140 increases, so that brightness unevenness is generated on a periphery of screen SC. As transmissive element 140 is convex to screen SC in order to reduce the incident angle on transmissive element 140, the amount of reflected light by transmissive element 140 decreases and thus a projection image in which even the periphery of screen SC has less brightness unevenness can be formed. In particular, as the light beam reflected by the second mirror is widened in the X-axis direction and reflected, transmissive element 140 with a curvature in the X-axis direction enhances an effect of reducing brightness unevenness. Transmissive element 140 is used for dust-proofing, and protects reflection optical system 120 and transmissive optical system 110 from dirt and dust and prevent foreign matter from entering. Consequently, transmissive element 140 is preferably disposed between second mirror 122 of reflection optical system 120 and screen SC. In a case where transmissive element 140 is disposed between first mirror 121 and second mirror 122, when transmissive element 140 is convex to screen SC (second mirror) for the purpose of reducing the brightness unevenness, it is necessary to increase an interval between first mirror 121 and second mirror 122. That is, it is not preferable because this configuration leads to an increase in size of whole reflection optical system 120. In reflection optical system 120, first mirror 121 closer to image display element 130 preferably has a free curved surface shape. First mirror 121 that has a free curved surface with positive power can correct image distortion, and at the same time, reduce a height of the ray incident on second mirror 122. Therefore, this configuration is advantageous to achieve downsizing. First mirror 121 and second mirror 122 are illustrated in FIG. 1, FIG. 2 so as to partially overlap a ray region. In actuality, however, effective diameters of first mirror 121 and second mirror 122 are appropriately set such that an image formed on image display element 130 is formed as a magnified image on screen SC without being blocked by first mirror 121 and second mirror 122.

A distance from lens mirror L14 in fourth lens group G4 disposed to be closest to screen SC to first mirror 121 having a reflecting surface that is a free curved surface is longer than a distance from first mirror 121 to second mirror 122. This configuration can reduce an interval between first mirror 121 and second mirror 122, whereby height reduction of projection optical system 100 in the Y-axis direction can be achieved.

Preferable conditions to be satisfied by projection optical system 100 according to a first exemplary embodiment will be described below. Note that a plurality of conditions are defined for projection optical system 100 of various numerical examples. A configuration of the projection optical system that satisfies all those conditions is most preferable. However, by satisfying an individual condition, a projection optical system exhibiting an effect corresponding to this condition can be obtained.

2. Examples of Optical System

Figure 3:
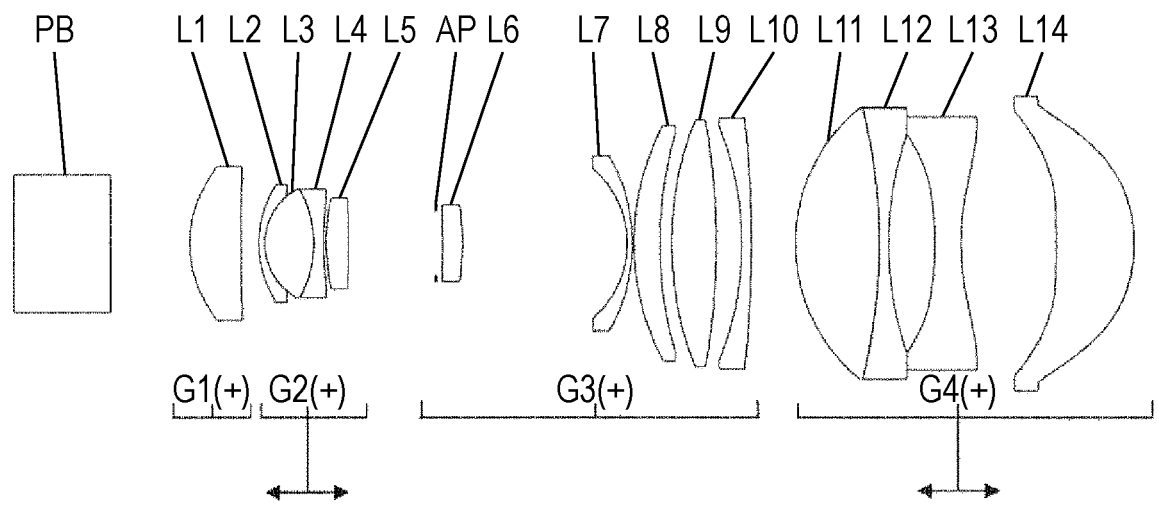
FIG. 3 is a configuration view of a transmissive optical system in a first numerical example.
Figure 4:
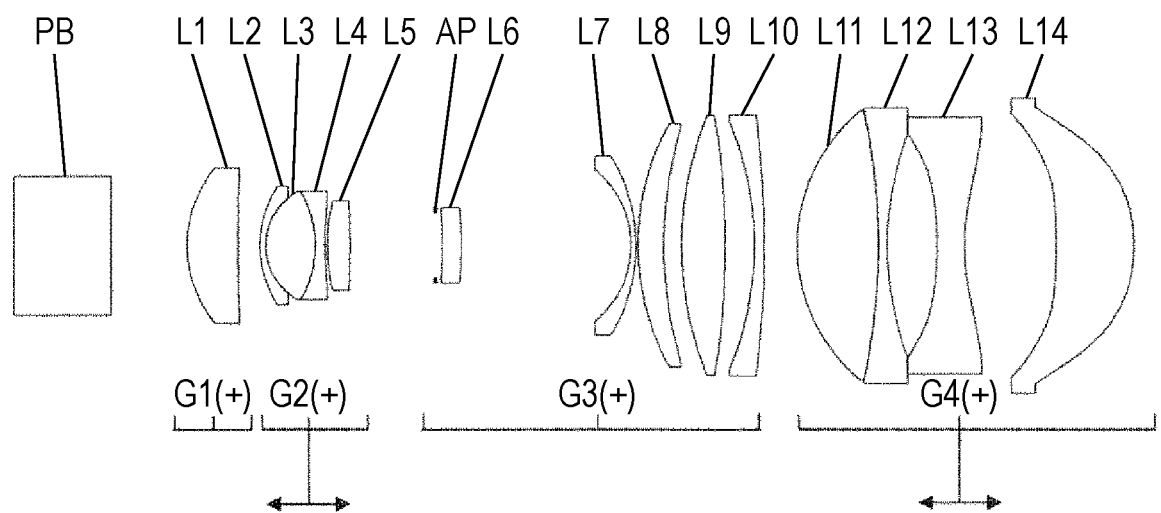
FIG. 4 is a configuration view of a transmissive optical system in a second numerical example.
Figure 5:
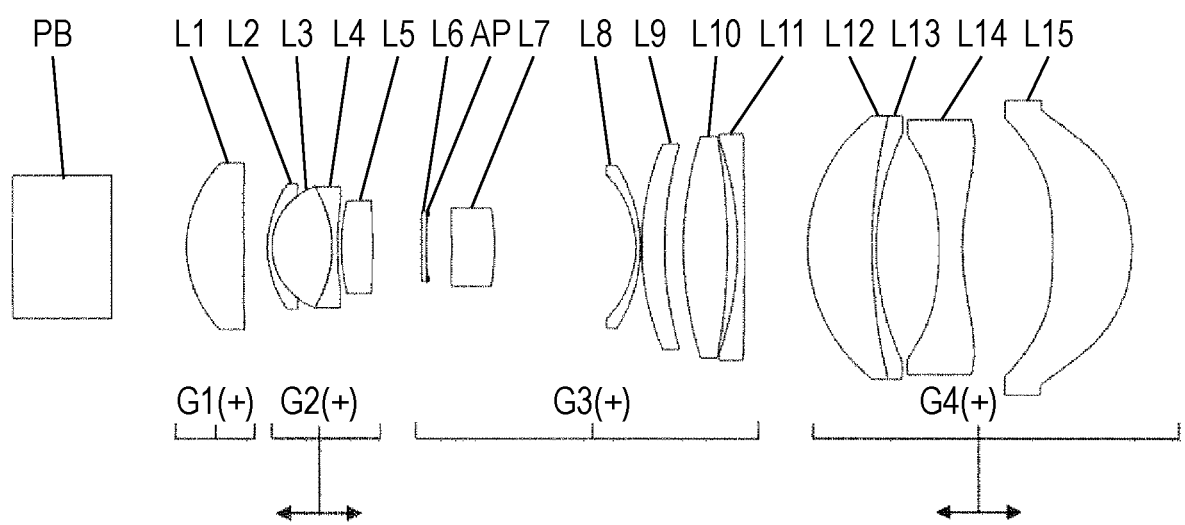
FIG. 5 is a configuration view of a transmissive optical system in a third numerical example.

Numerical examples of an optical system in image projection device 10 according to the present exemplary embodiment will be described below. FIG. 3 is a configuration view of transmissive optical system 110 of projection optical system 100 in a first numerical example. Transmissive optical system 110 of the first numerical example includes a plurality of lenses (lenses L1 to L14). FIG. 4 is a configuration view of transmissive optical system 110 in a second numerical example. Transmissive optical system 110 of the second numerical example includes a plurality of lenses (lenses L1 to L14). FIG. 5 is a configuration view of transmissive optical system 110 in a third numerical example. Transmissive optical system 110 of the third numerical example includes a plurality of lenses (lenses L1 to L15).

Projection optical system 100 according to the present disclosure preferably satisfies the following conditional expression (1).

$$0<TL/ft<10 \qquad (1)$$

wherein ft denotes a focal length of transmissive optical system 110, and

TL denotes a distance parallel to optical axis AZ that is from a position where a principal ray of a light beam is reflected by first mirror 121 to image display element 130, the light beam passing through the center of image display element 130 in the long-side direction and being projected on the closest screen SC to image projection device 10.

The conditional expression (1) defines an appropriate range of the focal length of transmissive optical system 110 and a total length. By satisfying the conditional expression (1), a projection optical system capable of reducing image distortion while being small in size can be provided. When TL/ft exceeds an upper limit of the conditional expression (1), the total length becomes larger than the transmissive optical system, thereby making downsizing of transmissive optical system 110 difficult. On the other hand, when TL/ft is less than a lower limit of the conditional expression (1), the total length becomes shorter than transmissive optical system 110, thereby making reduction in aberrations difficult.

By further satisfying the following conditional expression (1)′, the above effect can be more enhanced.

$$0.05<TL/ft<7.5 \qquad (1)'$$

By further satisfying the following conditional expression (1)″, the above effect can be more enhanced.

$$0.07<TL/ft<5.0 \qquad (1)''$$

The projection optical system according to the present disclosure preferably satisfies the following conditional expression (2).

$$0.1<ft/fmx<60 \qquad (2)$$

wherein fmx denotes a focal length in the X-axis direction (long-side direction of image) at a position on first mirror 121. The principal ray of a light beam passing through the center of image display element 130 in the long-side direction to be projected on screen SC closest to image projection device 10 is reflected by first mirror 121 at the position.

The conditional expression (2) defines an appropriate range of the shape of first mirror 121. When ft/fmx is less than a lower limit, a projection image is distorted largely in the long-side direction of image display element 130. On the other hand, when ft/fmx exceeds an upper limit, the interval between first mirror 121 and second mirror 122 becomes too large, thus making downsizing disadvantageous. In addition, as power of transmissive optical system 110 is too strong, a comatic aberration and field curvature occur in transmissive optical system 110.

The focal length in the X-axis direction at the position on first mirror 121 is represented by fmx=−1/(2×(d$^2$z/dx$^2$)). The principal ray of the light beam passing through the center of image display element 130 in the long-side direction to be projected on screen SC closest to image projection device 10 is reflected by first mirror 121 at the position. In the above expression, dz/dx denotes a change (slope) in a sag amount of a reflecting surface of first mirror 121 in the X-axis direction, and d$^2$z/dx$^2$ denotes a change in the slope of first mirror 121 in the X-axis direction.

By further satisfying the following conditional expression (2)′, the above effect can be more enhanced.

$$3<ft/fmx<50 \qquad (2)'$$

By further satisfying the following conditional expression (2)″, the above effect can be more enhanced.

$$5<ft/fmx<40 \qquad (2)''$$

The projection optical system according to the present disclosure preferably satisfies the following conditional expression (3).

$$0.1<ft/fmy<60 \qquad (3)$$

wherein fmy denotes a focal length at a position on first mirror 121 in the Y-axis direction (short-side direction of image). The principal ray of the light beam passing through the center of image display element 130 in the long-side direction to be projected on screen SC closest to image projection device 10 is reflected by first mirror 121 at the position.

The conditional expression (3) defines the appropriate range of the shape of first mirror 121. When ft/fmy is less than a lower limit, an image is distorted largely in the short-side direction of image display element 130. On the other hand, when ft/fmy exceeds an upper limit, the interval between first mirror 121 and second mirror 122 becomes too large, thus making downsizing disadvantageous. In addition, as the power of transmissive optical system 110 is too strong, a comatic aberration and field curvature occur in transmissive optical system 110.

The focal length in the Y-axis direction at the position on first mirror 121 is represented by fmy=−1/(2×(d$^2$z/dy$^2$)). The principal ray of the light beam passing through a center cross-section of image display element 130 in the long-side direction to be projected on screen SC closest to image projection device 10 is reflected by first mirror 121 at the position. In the above expression, dz/dy denotes a change (slope) in the sag amount of the reflecting surface of first mirror 121 in the Y-axis direction, and d$^2$z/dy$^2$ denotes a change in the slope in the Y-axis direction.

By further satisfying the following conditional expression (3)′, the above effect can be more enhanced.

$$3<ft/fmy<50 \qquad (3)'$$

By further satisfying the following conditional expression (3)″, the above effect can be more enhanced.

$$5<ft/fmy<45 \qquad (3)''$$

The projection optical system according to the present disclosure preferably satisfies the following conditional expression (4).

$$0<T2/T1<5 \qquad (4)$$

wherein

T1 denotes a total of a distance from a light beam reflected by first mirror 121, the light beam being furthest from optical axis AZ in the short-side direction of an image, to optical axis AZ and a distance from a light beam reflected by second mirror 122, the light beam being furthest from optical axis AZ in the short-side direction of an image, to optical axis AZ, and T2 denotes an optical path length of a ray passing through the center of image display element 130 in the long-side direction to be projected on screen SC closest to image projection device 10, the optical path length being from a lens closest to screen SC to first mirror 121.

The conditional expression (4) defines an appropriate range of the interval between transmissive optical system 110 and reflection optical system 120 and a size of a projection area due to a size of a light beam reflected by second mirror 122. When T2/T1 is less than a lower limit, an interval between the lens closest to the projection side and first mirror 121 is reduced and thus it is impossible to form an intermediate image with good aberration performance. Consequently, field curvature cannot be corrected appropriately on a projection surface. On the other hand, when T2/T1 exceeds an upper limit, the interval between the lens closest to the projection side and first mirror 121 is increased. A ray incident on reflection optical system 120 is thus widened too much, thus increasing the size of projection optical system 100 as a whole.

By further satisfying the following conditional expression (4)', the above effect can be more enhanced.

$$0.2 < T2/T1 < 4 \qquad (4)'$$

By further satisfying the following conditional expression (4)", the above effect can be more enhanced.

$$0.4 < T2/T1 < 2 \qquad (4)''$$

The projection optical system according to the present disclosure preferably satisfies the following conditional expression (5).

$$0 < T2/ft < 5 \qquad (5)$$

The conditional expression (5) defines an appropriate range of the focal length of transmissive optical system 110 and the interval between transmissive optical system 110 and reflection optical system 120. When T2/ft is less than a lower limit, the interval between the lens closest to the projection side in transmissive optical system 110 and the first mirror 121 is reduced. It is thus difficult to form an intermediate image that enables an image without any distortion to be projected on screen SC. On the other hand, when T2/ft exceeds an upper limit, the interval between the lens closest to the projection side and first mirror 121 is increased. A ray incident on reflection optical system 120 is widened, thus increasing the size of projection optical system 100 as a whole.

By further satisfying the following conditional expression (5)', the above effect can be more enhanced.

$$0.05 < T2/ft < 3 \qquad (5)'$$

By further satisfying the following conditional expression (5)", the above effect can be more enhanced.

$$0.10 < T2/ft < 2 \qquad (5)''$$

The projection optical system according to the present disclosure preferably satisfies the following conditional expression (6).

$$0 < T1/ft < 3 \qquad (6)$$

The conditional expression (6) defines an appropriate range of the size of projection optical system 100 by transmissive optical system 110 and second mirror 122. When T1/ft is less than a lower limit, second mirror 122 decreases in size. Consequently, the projection area cannot be increased. On the other hand, when T1/ft exceeds an upper limit, the size of second mirror 122 becomes too large. The size of projection optical system 100 thus increases in a direction of a distance (height) from optical axis AZ.

By further satisfying the following conditional expression (6)', the above effect can be more enhanced.

$$0.05 < T1/ft < 3 \qquad (6)'$$

By further satisfying the following conditional expression (6)", the above effect can be more enhanced.

$$0.10 < T1/ft < 2 \qquad (6)''$$

The projection optical system according to the present disclosure preferably satisfies the following conditional expression (7).

$$0.005 < Tr \times (T1/ft) < 1 \qquad (7)$$

wherein

Tr denotes a throw ratio of projection optical system 100.

The conditional expression (7) defines an appropriate range of the throw ratio of projection optical system 100 and the size of reflection optical system 120. The throw ratio is obtained by dividing a projection distance of projection optical system 100 by a longitudinal size of an image projected on screen SC. The projection distance is a distance from an upper end of second mirror 122 to screen SC. When Tr×(T1/ft) is less than a lower end, it is difficult to appropriately correct a distortion aberration on a projection surface. On the other hand, when Tr×(T1/ft) exceeds an upper limit, an exit pupil position of transmissive optical system 110 becomes closer to reflection optical system 120 and an angle of a ray incident from transmissive optical system 110 on reflection optical system 120 is increased. This configuration is not suitable for height reduction of projection optical system 100.

By further satisfying the following conditional expression (7)', the above effect can be more enhanced.

$$0.010 < Tr \times (T1/ft) < 0.50 \qquad (7)'$$

By further satisfying the following conditional expression (7)", the above effect can be more enhanced.

$$0.020 < Tr \times (T1/ft) < 0.30 \qquad (7)''$$

The projection optical system according to the present disclosure preferably satisfies the following conditional expression (8).

$$0.1 < fm\,max/ft < 10 \qquad (8)$$

wherein fmmax denotes a maximum focal length on a reflecting surface of first mirror 121.

The conditional expression (8) defines an appropriate range of a relationship between the focal length that is maximized on the reflecting surface of first mirror 121 and the focal length of transmissive optical system 110. When fmmax/ft is less than a lower limit, it is difficult to appropriately correct astigmatism near the center of screen SC closer to image projection device 10. On the other hand, when fmmax/ft exceeds an upper limit, it is difficult to correct distortion of a peripheral region of screen SC.

At the position of first mirror 121 where a ray emitted from image display element 130 is reflected, fmmax denotes a maximum focal length given $fmx = -1/(2 \times (d^2z/dx^2))$ and $fmy = -1/(2 \times (d^2z/dy^2))$.

By further satisfying the following conditional expression (8)', the above effect can be more enhanced.

$$0.130 \leq fm\,max/ft < 5 \qquad (8)'$$

By further satisfying the following conditional expression (8)", the above effect can be more enhanced.

$$0.160 \leq fm\,max/ft < 3 \qquad (8)''$$

The projection optical system according to the present disclosure preferably satisfies the following conditional expression (9).

$$0.001 < fm\ min/ft \leq 0.1 \qquad (9)$$

wherein fmmin denotes a focal length that is minimized at a position on the reflecting surface of first mirror 121 where each ray is reflected.

The conditional expression (9) defines an appropriate range of the focal length that is minimized on the reflecting surface of first mirror 121 among focal lengths calculated using positions on the reflecting surface of first mirror 121 where rays emitted from image display element 130 are reflected. When fmmin/ft is less than a lower limit, it is difficult to appropriately correct astigmatism near the center of screen SC closer to image projection device 10. On the other hand, when fmmin/ft exceeds an upper limit, it is difficult to appropriately correct distortion near the center of screen SC.

At the position of first mirror 121 where each ray emitted from image display element 130 is reflected, fmmin denotes a minimum focal length given $fmx=-1/(2\times(d^2z/dx^2))$ and $fmy=-1/(2\times(d^2z/dy^2))$.

By further satisfying the following conditional expression (9)', the above effect can be more enhanced.

$$0.010 < fm\ min/ft \leq 0.09 \qquad (9)'$$

By further satisfying the following conditional expression (9)", the above effect can be more enhanced.

$$0.015 < fm\ min/ft \leq 0.08 \qquad (9)"$$

Table 1 shows corresponding values for conditional expressions calculated for the projection optical system according to the first numerical example to the third numerical example.

Corresponding Values for Conditional Expressions

TABLE 1

|  | First Example | Second Example | Third Example |
|---|---|---|---|
| TL | 223.936 | 223.778 | 221.598 |
| fmx | 6.706 | 6.910 | 8.080 |
| fmy | 6.147 | 6.320 | 6.751 |
| T1 | 44.188 | 44.191 | 41.612 |
| T2 | 49.368 | 50.323 | 51.441 |
| fmmax | 49.942 | 50.105 | 61.698 |
| fmmin | 4.850 | 5.159 | 4.396 |
| Conditional Expression (1) | 0.922 | 1.362 | 3.422 |
| Conditional Expression (2) | 36.233 | 23.775 | 8.016 |
| Conditional Expression (3) | 39.524 | 25.995 | 9.593 |
| Conditional Expression (4) | 1.117 | 1.139 | 1.236 |
| Conditional Expression (5) | 0.203 | 0.306 | 0.794 |
| Conditional Expression (6) | 0.182 | 0.269 | 0.643 |
| Conditional Expression (7) | 0.032 | 0.047 | 0.118 |
| Conditional Expression (8) | 0.206 | 0.305 | 0.953 |
| Conditional Expression (9) | 0.020 | 0.031 | 0.068 |

The numerical examples specifically implementing the projection optical system according to the exemplary embodiment described above will be described below. Note that in each numerical example, units of a length in the tables are all "mm", and units of a field angle in the tables are all "°". In each numerical example, r denotes a radius of curvature, d denotes an interval between surfaces, nd denotes a refractive index at a d-line, and vd denotes the Abbe number at the d-line. In each numerical example, a surface attached with * is an aspherical surface or a free curved surface, and an aspherical shape is defined by the following expression.

$$z = \frac{cr^2}{1 + \sqrt{1-(1+k)c^2r^2}} + Ar^4 + Br^6 + Cr^8 + Dr^{10} + Er^{12} + Fr^{14} + Gr^{16} \qquad \text{[Expression 1]}$$

wherein z denotes a sag amount of a surface parallel to the Z axis, r denotes a distance in a radial direction $(=\sqrt{(x^2+y^2)})$, c denotes a curvature at a surface vertex, and k denotes a conic coefficient.

Note that, with respect to aspherical coefficients, only non-zero coefficients are shown other than conical constant K. In lens group data, a lens configuration length is an interval from a first surface to a final surface. A front-side principal point position is a distance from the first surface, and a rear-side principal point position is a distance from the first surface.

Furthermore, the free curved surface shape is defined by the following expressions using a local orthogonal coordinate system (x, y, z) defining its surface vertex as an origin.

$$z = \frac{cr^2}{1 + \sqrt{1-(1+k)c^2r^2}} + \sum_{j=2}^{137} C_j x^m y^n \qquad \text{[Expression 2]}$$

$$j = \frac{(m+n)^2 + m + 3n}{2} + 2 \qquad \text{[Expression 3]}$$

wherein z denotes the sag amount of a surface parallel to the Z axis, r denotes the distance in the radial direction $(=\sqrt{(x^2+y^2)})$, c denotes the curvature at the surface vertex, k denotes the conic coefficient, and Cj denotes a coefficient of a monomial $x^m y^n$.

Note that, in the following data, an i-th order term of x and a j-th order term of y of a free curved surface coefficient in a polynomial is denoted as xiyj, for convenience. For example, "X2Y" indicates a free curved surface coefficient with a second order term of x and a first order term of y in the polynomial.

(1) First Numerical Example

Table 2 to Table 7 below show specific data of a transmissive optical system of the first numerical example. Note that the throw ratio is 0.175 in the first numerical example. Projection magnification is between 111.79 to 217.09 (inclusive). Sizes of an image display element to be used are 9.856 mm in the long-side direction and 6.162 mm in the short-side direction.

Surface data of respective optical elements in the first example will be shown in Table 2 below.

TABLE 2

| Surface number | r (Y-axis direction) | r (X-axis direction) | d | nd | vd | Effective diameter | Eccentricity of Y | Tilt α | Notes |
|---|---|---|---|---|---|---|---|---|---|
| DMD surface | | | | | | | | | |
| 1 | Infinity | Infinity | 1.000 | | | | −1.230 | | |
| 2 | Infinity | Infinity | 15.000 | 1.51680 | 64.20 | | | | |
| 3 | Infinity | Infinity | 12.389 | | | | | | |
| 4* | 18.143 | 18.143 | 8.000 | 1.59349 | 67.00 | | | | |
| 5* | 1071.887 | 1071.887 | Variable | | | | | | |
| 6 | 16.711 | 16.711 | 0.900 | 1.95375 | 32.32 | | | | |
| 7 | 9.455 | 9.455 | 7.600 | 1.49700 | 81.61 | | | | |
| 8 | −16.609 | −16.609 | 1.500 | 1.90366 | 31.31 | | | | |
| 9 | 54.556 | 54.556 | 0.419 | | | | | | |
| 10 | 30.215 | 30.215 | 3.500 | 1.84666 | 23.78 | | | | |
| 11 | −134.074 | −134.074 | Variable | | | | | | |
| 12 (diaphragm) | Infinity | Infinity | 1.000 | | | 9.964 | | | |
| 13 | −141.786 | −141.786 | 3.000 | 1.72825 | 28.32 | | | | |
| 14 | −44.735 | −44.735 | 25.696 | | | | | | |
| 15 | −14.911 | −14.911 | 0.800 | 1.71300 | 53.94 | | | | |
| 16 | −26.716 | −26.716 | 0.300 | | | | | | |
| 17 | 38.576 | 38.576 | 4.000 | 1.70154 | 41.15 | | | | |
| 18 | 61.536 | 61.536 | 1.788 | | | | | | |
| 19 | 53.406 | 53.406 | 6.600 | 1.75211 | 25.05 | | | | |
| 20 | −112.460 | −112.460 | 3.966 | | | | | | |
| 21 | −47.828 | −47.828 | 1.500 | 1.59349 | 67.00 | | | | |
| 22 | −174.726 | −174.726 | Variable | | | | | | |
| 23 | 26.615 | 26.615 | 13.000 | 1.72916 | 54.67 | | | | |
| 24 | −84.826 | −84.826 | 1.500 | 1.92286 | 20.88 | | | | |
| 25 | 50.147 | 50.147 | 7.220 | | | | | | |
| 26* | −56.182 | −56.182 | 4.200 | 1.68893 | 31.07 | | | | |
| 27* | 32.777 | 32.777 | 14.813 | | | | | | |
| 28* | −341.331 | −341.331 | 12.000 | 1.53775 | 74.70 | | | | |
| 29* | −24.581 | −24.581 | Variable | | | | | | |
| 30* | −50.193 | −50.193 | 0.000 | | | −46.500 | −51.300 | | Mirror |
| 31 | | | −41.380 | | | | | | |
| 32 | | | 6.560 | | | 81.106 | 18.100 | | Mirror |
| 33 | Infinity | −113.000 | 2.000 | 1.51680 | 64.20 | 33.200 | | | Only surface is eccentric |
| 34 | Infinity | −115.000 | Variable | | | 33.200 | | | Only surface is eccentric |
| 35 | | | | | | | −32.800 | | Screen |

Aspherical data is shown below in Table 3.

TABLE 3

| Coefficient | Fourth surface | Fifth surface | 26th surface | 27th surface | 28th surface | 29th surface |
|---|---|---|---|---|---|---|
| k | −0.04170 | 0.00000 | 3.27897 | 0.47070 | 99.96900 | −0.09921 |
| A | 2.3514E−05 | 2.4582E−05 | 2.6382E−06 | −3.4014E−05 | −5.0467E−05 | −2.2030E−05 |
| B | −7.7306E−08 | 8.2842E−08 | −2.7334E−07 | 3.2338E−08 | −1.9327E−07 | −6.4774E−08 |
| C | −4.9027E−10 | −2.8535E−09 | 9.8427E−10 | −5.9025E−11 | 1.4604E−09 | 1.9181E−10 |
| D | −7.9495E−13 | 6.7999E−12 | −1.0277E−12 | −1.1384E−13 | −2.5041E−12 | 7.8913E−14 |
| E | 1.8289E−14 | 1.2796E−13 | −7.9603E−17 | 2.7126E−16 | 2.4112E−17 | −3.7685E−16 |
| F | 3.4998E−17 | −9.4584E−16 | 4.8660E−19 | 5.5053E−19 | 5.1603E−19 | −1.2712E−19 |
| G | −5.4231E−19 | 1.6552E−18 | −4.1088E−22 | −9.6601E−22 | 3.4709E−21 | 9.1484E−22 |

Free curved surface data is shown below in Table 4.

TABLE 4

| Coefficient | Order | Free curved surface mirror |
|---|---|---|
| k | 0 | −0.403199863 |
| C5 | X2 | −1.31862E−03 |
| C7 | Y2 | 1.88251E−02 |
| C9 | X2Y | 1.84263E−04 |
| C11 | Y3 | −6.09179E−04 |
| C12 | X4 | 4.19506E−06 |
| C14 | X2Y2 | −9.79777E−06 |
| C16 | Y4 | 1.49872E−05 |

TABLE 4-continued

| Coefficient | Order | Free curved surface mirror |
|---|---|---|
| C18 | X4Y | −7.94402E−07 |
| C20 | X2Y3 | 5.26153E−08 |
| C22 | Y5 | −1.50240E−07 |
| C23 | X6 | −2.42504E−09 |
| C25 | X4Y2 | 6.80124E−08 |
| C27 | X2Y4 | 3.82936E−09 |
| C29 | Y6 | −9.09269E−11 |
| C31 | X6Y | −5.59445E−10 |
| C33 | X4Y3 | −2.82875E−09 |
| C35 | X2Y5 | 1.71428E−10 |
| C37 | Y7 | 9.87541E−12 |
| C38 | X8 | 1.30229E−11 |
| C40 | X6Y2 | 4.87074E−11 |
| C42 | X4Y4 | 4.24071E−11 |
| C44 | X2Y6 | −1.47586E−11 |
| C46 | Y8 | 1.72149E−14 |
| C48 | X8Y | 5.54630E−13 |
| C50 | X6Y3 | −1.56941E−12 |
| C52 | X4Y5 | 4.76512E−13 |
| C54 | X2Y7 | 2.67145E−13 |
| C56 | Y9 | 1.02923E−15 |
| C57 | X10 | −5.04121E−14 |
| C59 | X8Y2 | 1.94831E−14 |
| C61 | X6Y4 | 4.80831E−15 |
| C63 | X4Y6 | −9.97033E−15 |
| C65 | X2Y8 | −7.04488E−16 |
| C67 | Y10 | 2.75018E−17 |
| C69 | X10Y1 | −1.81743E−15 |
| C71 | X8Y3 | −2.55302E−15 |
| C73 | X6Y5 | 1.35471E−15 |
| C75 | X4Y7 | −4.91298E−16 |
| C77 | X2Y9 | 2.70828E−17 |
| C79 | Y11 | −7.29563E−19 |
| C80 | X12 | 1.58722E−16 |
| C82 | X10Y2 | 8.81432E−17 |
| C84 | X8Y4 | 8.60305E−18 |
| C86 | X6Y6 | −2.24810E−17 |
| C88 | X4Y8 | 7.08458E−18 |
| C90 | X2Y10 | −1.18694E−18 |
| C92 | Y12 | −1.75144E−20 |
| C94 | X12Y1 | −6.84567E−18 |
| C96 | X10Y3 | 4.10754E−18 |
| C98 | X8Y5 | 6.51245E−19 |
| C100 | X6Y7 | −4.86385E−19 |
| C102 | X4Y9 | 2.79283E−19 |
| C104 | X2Y11 | −1.51013E−20 |
| C106 | Y13 | 1.45912E−22 |
| C107 | X14 | −4.90231E−20 |
| C109 | X12Y2 | 8.13046E−20 |
| C111 | X10Y4 | −1.60892E−19 |
| C113 | X8Y6 | 1.24813E−20 |
| C115 | X6Y8 | 1.33666E−20 |
| C117 | X4Y10 | −7.13494E−21 |
| C119 | X2Y12 | 7.56101E−22 |
| C121 | Y14 | 6.63380E−24 |
| C123 | X14Y1 | 1.36470E−21 |
| C125 | X12Y3 | −3.78806E−22 |
| C127 | X10Y5 | 1.34835E−21 |
| C129 | X8Y7 | −2.80183E−22 |
| C131 | X6Y9 | −7.44194E−23 |
| C133 | X4Y11 | 4.52702E−23 |
| C135 | X2Y13 | −6.08254E−24 |
| C137 | Y15 | −7.07601E−26 |

Zoom data is shown below in Table 5.

TABLE 5

| Projection size (inch) | 50" | 80" | 100" |
|---|---|---|---|
| d5 | 2.953 | 2.826 | 2.787 |
| d11 | 13.511 | 13.638 | 13.677 |
| d22 | 6.163 | 6.850 | 7.050 |
| d29 | 10.987 | 10.300 | 10.100 |
| d34 | 239.141 | 377.779 | 457.905 |

Single lens data is shown below in Table 6.

TABLE 6

| Lens number | Focal length |
|---|---|
| L1 | 31.01 |
| L2, L3, L4 | −35.70 |
| L5 | 29.41 |
| L6 | 88.59 |
| L7 | −48.70 |
| L8 | 137.50 |
| L9 | 48.98 |
| L10 | −111.45 |
| L11, L12 | 88.20 |
| L13 | −29.48 |
| L14 | 48.61 |

Lens group data is shown below in Table 7.

TABLE 7

| Lens group | Focal length |
|---|---|
| G1 | 31.01 |
| G2 | 225.44 |
| G3 | 94.87 |
| G4 | 124.47 |

(2) Second Numerical Example

Table 8 to Table 13 below show specific data of a transmissive optical system of the second numerical example. Note that the throw ratio is 0.176 in the second numerical example. Projection magnification is between 113.23 to 217.59 (inclusive). Sizes of an image display element to be used are 9.856 mm in the long-side direction and 6.162 mm in the short-side direction.

Surface data of respective optical elements in the second example will be shown in Table 8 below.

TABLE 8

| Surface number | r (Y-axis direction) | r (X-axis direction) | d | nd | vd | Effective diameter | Eccentricity of Y | Tilt α | Notes |
|---|---|---|---|---|---|---|---|---|---|
| DMD surface | | | | | | | | | |
| 1 | Infinity | Infinity | 1.000 | | | | −1.233 | | |
| 2 | Infinity | Infinity | 15.000 | 1.51680 | 64.20 | | | | |
| 3 | Infinity | Infinity | 11.706 | | | | | | |

TABLE 8-continued

| Surface number | r (Y-axis direction) | r (X-axis direction) | d | nd | vd | Effective diameter | Eccentricity of Y | Tilt α | Notes |
|---|---|---|---|---|---|---|---|---|---|
| 4* | 18.222 | 18.222 | 8.000 | 1.59349 | 67.00 | | | | |
| 5* | 52516.060 | 52516.060 | Variable | | | | | | |
| 6 | 16.584 | 16.584 | 0.900 | 1.95375 | 32.32 | | | | |
| 7 | 9.520 | 9.520 | 7.600 | 1.49700 | 81.61 | | | | |
| 8 | −16.480 | −16.480 | 1.500 | 1.90366 | 31.31 | | | | |
| 9 | 55.608 | 55.608 | 0.400 | | | | | | |
| 10 | 30.315 | 30.315 | 3.500 | 1.84666 | 23.78 | | | | |
| 11 | −133.595 | −133.595 | Variable | | | | | | |
| 12 (diaphragm) | Infinity | Infinity | 1.000 | | | 9.778 | | | |
| 13 | −133.400 | −133.400 | 3.000 | 1.72825 | 28.32 | | | | |
| 14 | −45.067 | −45.067 | 26.215 | | | | | | |
| 15 | −14.844 | −14.844 | 0.800 | 1.71300 | 53.94 | | | | |
| 16 | −25.738 | −25.738 | 0.300 | | | | | | |
| 17 | 38.553 | 38.553 | 4.000 | 1.70154 | 41.15 | | | | |
| 18 | 62.660 | 62.660 | 2.749 | | | | | | |
| 19 | 53.548 | 53.548 | 6.600 | 1.75211 | 25.05 | | | | |
| 20 | −122.013 | −122.013 | 4.464 | | | | | | |
| 21 | −48.554 | −48.554 | 1.500 | 1.59349 | 67.00 | | | | |
| 22 | −159.561 | −159.561 | Variable | | | | | | |
| 23 | 26.757 | 26.757 | 12.500 | 1.72916 | 54.67 | | | | |
| 24 | −96.740 | −96.740 | 1.500 | 1.92286 | 20.88 | | | | |
| 25 | 48.336 | 48.336 | 7.744 | | | | | | |
| 26* | −53.360 | −53.360 | 4.300 | 1.68893 | 31.07 | | | | |
| 27* | 32.603 | 32.603 | 14.048 | | | | | | |
| 28* | −285.848 | −285.848 | 12.000 | 1.53775 | 74.70 | | | | |
| 29* | −24.449 | −24.449 | Variable | | | | | | |
| 30* | −52.242 | −52.242 | 0.000 | | | | −46.490 | −51.253 | Mirror |
| 31 | | | −41.493 | | | | | | |
| 32 | | | 7.584 | | | | 81.106 | 18.066 | Mirror |
| 33 | Infinity | −113.000 | 2.000 | 1.51680 | 64.20 | 33.188 | | | Only surface is eccentric |
| 34 | Infinity | −115.000 | Variable | | | 33.188 | | | Only surface is eccentric |
| 35 | | | | | | −32.813 | | | Screen |

Aspherical data is shown below in Table 9.

TABLE 9

| Coefficient | Fourth surface | Fifth surface | 26th surface | 27th surface | 28th surface | 29th surface |
|---|---|---|---|---|---|---|
| k | −0.06294 | 100.00000 | 2.39088 | 0.39346 | 99.88494 | −0.11200 |
| A | 2.0455E−05 | 2.3752E−05 | 2.9453E−06 | −3.4067E−05 | −5.2625E−05 | −2.3049E−05 |
| B | −4.3767E−08 | 8.4328E−08 | −2.6673E−07 | 3.5932E−08 | −1.8860E−07 | −6.2933E−08 |
| C | −7.2302E−10 | −2.6662E−09 | 9.8397E−10 | −5.0860E−11 | 1.4665E−09 | 1.8286E−10 |
| D | −8.0267E−13 | 6.1795E−12 | −1.0393E−12 | −1.2835E−13 | −2.5209E−12 | 7.6061E−14 |
| E | 2.5214E−14 | 1.2112E−13 | −1.6879E−16 | 2.3411E−16 | −3.6438E−17 | −3.6909E−16 |
| F | 1.0676E−16 | −7.9574E−16 | 1.9109E−19 | 5.7624E−19 | 4.4936E−19 | −1.1612E−19 |
| G | −1.1776E−18 | 6.3427E−19 | 6.6748E−22 | −1.0043E−21 | 3.7229E−21 | 9.2240E−22 |

Free curved surface data is shown below in Table 10.

TABLE 10

| Coefficient | Order | Free curved surface mirror |
|---|---|---|
| k | 0 | −0.339472892 |
| C5 | X2 | −1.68479E−03 |
| C7 | Y2 | 1.81782E−02 |
| C9 | X2Y | 1.88023E−04 |
| C11 | Y3 | −5.97931E−04 |
| C12 | X4 | 3.28817E−06 |
| C14 | X2Y2 | −1.03273E−05 |
| C16 | Y4 | 1.49436E−05 |
| C18 | X4Y | −5.81747E−07 |
| C20 | X2Y3 | 1.24404E−07 |
| C22 | Y5 | −1.61047E−07 |
| C23 | X6 | −5.44989E−09 |
| C25 | X4Y2 | 3.97207E−08 |
| C27 | X2Y4 | −1.64885E−09 |
| C29 | Y6 | 5.43000E−11 |
| C31 | X6Y | 6.91988E−10 |
| C33 | X4Y3 | −1.35166E−09 |
| C35 | X2Y5 | 3.16738E−10 |
| C37 | Y7 | 1.46824E−11 |
| C38 | X8 | 4.41749E−13 |
| C40 | X6Y2 | −3.56100E−11 |
| C42 | X4Y4 | 2.35506E−11 |
| C44 | X2Y6 | −1.49915E−11 |
| C46 | Y8 | −6.48453E−15 |

TABLE 10-continued

| Coefficient | Order | Free curved surface mirror |
|---|---|---|
| C48 | X8Y | 1.26815E−14 |
| C50 | X6Y3 | 8.35959E−13 |
| C52 | X4Y5 | −1.99455E−13 |
| C54 | X2Y7 | 2.68628E−13 |
| C56 | Y9 | −1.23732E−15 |
| C57 | X10 | −2.21240E−16 |
| C59 | X8Y2 | 3.98117E−17 |
| C61 | X6Y4 | −7.74138E−15 |
| C63 | X4Y6 | 9.51640E−16 |
| C65 | X2Y8 | −1.82634E−15 |
| C67 | Y10 | 4.47930E−18 |
| C69 | X10Y1 | −3.97067E−17 |
| C71 | X8Y3 | 1.41368E−17 |
| C73 | X6Y5 | −1.18401E−17 |
| C75 | X4Y7 | 2.38903E−18 |
| C77 | X2Y9 | −6.51385E−20 |
| C79 | Y11 | 1.03868E−20 |
| C80 | X12 | 9.33180E−19 |
| C82 | X10Y2 | −4.17633E−19 |
| C84 | X8Y4 | 4.11424E−20 |
| C86 | X6Y6 | −4.55254E−20 |
| C88 | X4Y8 | −6.65658E−20 |
| C90 | X2Y10 | 8.37395E−21 |
| C92 | Y12 | 2.32703E−22 |
| C94 | X12Y1 | −6.52974E−20 |
| C96 | X10Y3 | 1.45458E−20 |
| C98 | X8Y5 | −3.68586E−21 |
| C100 | X6Y7 | 7.34041E−21 |
| C102 | X4Y9 | −2.36112E−21 |
| C104 | X2Y11 | 2.96099E−22 |
| C106 | Y13 | 2.62847E−24 |
| C107 | X14 | 5.01918E−22 |
| C109 | X12Y2 | 1.26536E−21 |
| C111 | X10Y4 | −2.76492E−22 |
| C113 | X8Y6 | 1.86915E−23 |
| C115 | X6Y8 | 8.62424E−23 |
| C117 | X4Y10 | −2.28183E−23 |
| C119 | X2Y12 | 2.00930E−24 |
| C121 | Y14 | 3.24178E−26 |
| C123 | X14Y1 | −5.18199E−23 |
| C125 | X12Y3 | 1.02938E−22 |
| C127 | X10Y5 | −5.78942E−23 |
| C129 | X8Y7 | 1.54359E−23 |
| C131 | X6Y9 | −4.52945E−24 |
| C133 | X4Y11 | 1.08800E−24 |
| C135 | X2Y13 | −1.45344E−25 |
| C137 | Y15 | −9.03177E−28 |

Zoom data is shown below in Table 11.

TABLE 11

| Projection size (inch) | 50" | 80" | 100" |
|---|---|---|---|
| d5 | 3.494 | 3.363 | 3.317 |
| d11 | 12.988 | 13.119 | 13.165 |
| d22 | 4.344 | 5.096 | 5.312 |
| d29 | 12.286 | 11.535 | 11.319 |
| d34 | 239.355 | 377.930 | 457.926 |

Single lens data is shown below in Table 12.

TABLE 12

| Lens number | Focal length |
|---|---|
| L1 | 30.71 |
| L2, L3, L4 | −37.11 |
| L5 | 29.47 |
| L6 | 92.14 |
| L7 | −50.74 |
| L8 | 133.70 |
| L9 | 50.29 |
| L10 | −118.19 |
| L11, L12 | 93.51 |
| L13 | −28.79 |
| L14 | 48.93 |

Lens group data is shown below in Table 13.

TABLE 13

| Lens group | Focal length |
|---|---|
| G1 | 30.71 |
| G2 | 191.20 |
| G3 | 92.40 |
| G4 | 139.70 |

(3) Third Numerical Example

Table 14 to Table 19 below show specific data of a transmissive optical system of the third numerical example. Note that the throw ratio is 0.184 in the first numerical example. Projection magnification is between 112.85 to 217.12 (inclusive). Sizes of an image display element to be used are 9.856 mm in the long-side direction and 6.162 mm in the short-side direction.

Surface data of respective optical elements in the third example will be shown in Table 14 below.

TABLE 14

| Surface number | r (Y-axis direction) | r (X-axis direction) | d | nd | vd | Effective diameter | Eccentricity of Y | Tilt α | Notes |
|---|---|---|---|---|---|---|---|---|---|
| DMD surface | | | | | | | | | |
| 1 | Infinity | Infinity | 1.000 | | | | −1.237 | | |
| 2 | Infinity | Infinity | 15.000 | 1.51680 | 64.20 | | | | |
| 3 | Infinity | Infinity | 11.500 | | | | | | |
| 4* | 18.654 | 18.654 | 8.710 | 1.59349 | 67.00 | | | | |
| 5* | −234.636 | −234.636 | Variable | | | | | | |
| 6 | 16.558 | 16.558 | 0.700 | 1.95375 | 32.32 | | | | |
| 7 | 9.942 | 9.942 | 9.107 | 1.49700 | 81.61 | | | | |
| 8 | −17.602 | −17.602 | 0.845 | 1.90366 | 31.31 | | | | |
| 9 | 52.918 | 52.918 | 0.593 | | | | | | |
| 10 | 30.721 | 30.721 | 4.705 | 1.84666 | 23.78 | | | | |
| 11 | −122.453 | −122.453 | Variable | | | | | | |
| 12 | −1041.154 | −1041.154 | 0.700 | | | | | | |
| 13 | 117.875 | 117.875 | 0.187 | 1.69895 | 30.05 | | | | |
| 14 | Infinity | Infinity | 3.694 | | | 9.043 | | | |

TABLE 14-continued

| Surface number | r (Y-axis direction) | r (X-axis direction) | d | nd | vd | Effective diameter | Eccentricity of Y | Tilt α | Notes |
|---|---|---|---|---|---|---|---|---|---|
| (diaphragm) | | | | | | | | | |
| 15 | −142.236 | −142.236 | 6.429 | 1.69895 | 30.05 | | | | |
| 16 | −40.484 | −40.484 | 21.565 | | | | | | |
| 17 | −15.927 | −15.927 | 0.707 | 1.72000 | 43.90 | | | | |
| 18 | −23.327 | −23.327 | 0.208 | | | | | | |
| 19 | 39.863 | 39.863 | 3.553 | 1.76182 | 26.61 | | | | |
| 20 | 58.936 | 58.936 | 2.697 | | | | | | |
| 21 | 60.058 | 60.058 | 6.434 | 1.68893 | 31.16 | | | | |
| 22 | −93.684 | −93.684 | 1.517 | | | | | | |
| 23 | −50.020 | −50.020 | 1.136 | 1.49700 | 81.61 | | | | |
| 24 | −515.019 | −515.019 | Variable | | | | | | |
| 25 | 25.789 | 25.789 | 9.764 | 1.71300 | 53.94 | | | | |
| 26 | 84.288 | 84.288 | 0.700 | 1.94595 | 17.98 | | | | |
| 27 | 41.071 | 41.071 | 9.471 | | | | | | |
| 28* | −47.124 | −47.124 | 3.491 | 1.72825 | 28.32 | | | | |
| 29* | 33.877 | 33.877 | 13.516 | | | | | | |
| 30* | −139.739 | −139.739 | 11.992 | 1.53775 | 74.70 | | | | |
| 31* | −25.313 | −25.313 | Variable | | | | | | |
| 32* | −53.831 | −53.831 | 0.000 | | | | −47.487 | −51.967 | Mirror |
| 33 | | | −29.472 | | | | | | |
| 34 | | | 29.130 | | | | 45.435 | 21.817 | Mirror |
| 35 | Infinity | −110.000 | 2.000 | 1.51680 | 64.17 | | | 30.150 | Only surface is eccentric |
| 36 | Infinity | −112.000 | Variable | | | | | 30.150 | Only surface is eccentric |
| 37 | | | | | | | | −29.849 | Screen |

Aspherical data is shown below in Table 15.

TABLE 15

| Coefficient | Fourth surface | Fifth surface | 28th surface | 29th surface | 30th surface | 31st surface |
|---|---|---|---|---|---|---|
| k | −0.11911 | −100.00000 | 1.49000 | 0.03343 | −100.00000 | −0.06990 |
| A | 1.7586E−05 | 2.5727E−05 | 5.5464E−06 | −4.0062E−05 | −5.9463E−05 | −1.9718E−05 |
| B | −6.1241E−08 | 3.7358E−08 | −2.6587E−07 | 3.4773E−08 | −1.8135E−07 | −6.3309E−08 |
| C | −3.7409E−10 | −1.5158E−09 | 9.6259E−10 | −3.3119E−11 | 1.4903E−09 | 1.4495E−10 |
| D | 8.4280E−13 | 4.1544E−12 | −1.0211E−12 | −1.1247E−13 | −2.5434E−12 | 1.5352E−13 |
| E | 1.8394E−14 | 7.3391E−14 | −5.0937E−17 | 2.1517E−16 | −9.2107E−17 | −2.0710E−16 |
| F | −8.2679E−17 | −5.3758E−16 | 7.6863E−20 | 3.6714E−19 | 4.1431E−19 | −1.2043E−19 |
| G | 4.8557E−20 | 9.7649E−19 | −1.6635E−22 | −1.0047E−21 | 3.6827E−21 | 3.1127E−22 |

Free curved surface data is shown below in Table 16.

TABLE 16

| Coefficient | Order | Free curved surface mirror |
|---|---|---|
| k | 0 | −0.323338401 |
| C5 | X2 | −2.28863E−03 |
| C7 | Y2 | 1.80948E−02 |
| C9 | X2Y | 3.37331E−04 |
| C11 | Y3 | −6.50665E−04 |
| C12 | X4 | 1.38434E−06 |
| C14 | X2Y2 | −2.61702E−05 |
| C16 | Y4 | 1.73183E−05 |
| C18 | X4Y | −2.36915E−07 |
| C20 | X2Y3 | 9.73376E−07 |
| C22 | Y5 | −2.04905E−07 |
| C23 | X6 | −4.62630E−09 |
| C25 | X4Y2 | 1.66324E−08 |
| C27 | X2Y4 | −2.34240E−08 |
| C29 | Y6 | 3.46805E−11 |
| C31 | X6Y | 5.21006E−10 |
| C33 | X4Y3 | −6.80128E−10 |
| C35 | X2Y5 | 4.69642E−10 |
| C37 | Y7 | 2.32373E−11 |
| C38 | X8 | 2.35093E−12 |
| C40 | X6Y2 | −2.33734E−11 |
| C42 | X4Y4 | 1.55433E−11 |
| C44 | X2Y6 | −1.02562E−11 |
| C46 | Y8 | −8.26876E−15 |
| C48 | X8Y | −1.64238E−13 |
| C50 | X6Y3 | 5.33848E−13 |
| C52 | X4Y5 | −1.82709E−13 |
| C54 | X2Y7 | 1.60166E−13 |
| C56 | Y9 | −3.31161E−15 |
| C57 | X10 | 4.93041E−16 |
| C59 | X8Y2 | 1.95319E−15 |
| C61 | X6Y4 | −4.98663E−15 |
| C63 | X4Y6 | 9.04991E−16 |
| C65 | X2Y8 | −1.10711E−15 |
| C67 | Y10 | 2.16733E−17 |
| C69 | X10Y1 | 0.00000E+00 |
| C71 | X8Y3 | 0.00000E+00 |
| C73 | X6Y5 | 0.00000E+00 |
| C75 | X4Y7 | 0.00000E+00 |
| C77 | X2Y9 | 0.00000E+00 |
| C79 | Y11 | 0.00000E+00 |
| C80 | X12 | 0.00000E+00 |

TABLE 16-continued

| Coefficient | Order | Free curved surface mirror |
|---|---|---|
| C82 | X10Y2 | 0.00000E+00 |
| C84 | X8Y4 | 0.00000E+00 |
| C86 | X6Y6 | 0.00000E+00 |
| C88 | X4Y8 | 0.00000E+00 |
| C90 | X2Y10 | 0.00000E+00 |
| C92 | Y12 | 0.00000E+00 |
| C94 | X12Y1 | 0.00000E+00 |
| C96 | X10Y3 | 0.00000E+00 |
| C98 | X8Y5 | 0.00000E+00 |
| C100 | X6Y7 | 0.00000E+00 |
| C102 | X4Y9 | 0.00000E+00 |
| C104 | X2Y11 | 0.00000E+00 |
| C106 | Y13 | 0.00000E+00 |
| C107 | X14 | 0.00000E+00 |
| C109 | X12Y2 | 0.00000E+00 |
| C111 | X10Y4 | 0.00000E+00 |
| C113 | X8Y6 | 0.00000E+00 |
| C115 | X6Y8 | 0.00000E+00 |
| C117 | X4Y10 | 0.00000E+00 |
| C119 | X2Y12 | 0.00000E+00 |
| C121 | Y14 | 0.00000E+00 |
| C123 | X14Y1 | 0.00000E+00 |
| C125 | X12Y3 | 0.00000E+00 |
| C127 | X10Y5 | 0.00000E+00 |
| C129 | X8Y7 | 0.00000E+00 |
| C131 | X6Y9 | 0.00000E+00 |
| C133 | X4Y11 | 0.00000E+00 |
| C135 | X2Y13 | 0.00000E+00 |
| C137 | Y15 | 0.00000E+00 |

Zoom data is shown below in Table 17.

TABLE 17

| Projection size (inch) | 50" | 80" | 100" |
|---|---|---|---|
| d5 | 3.802 | 3.622 | 3.556 |
| d11 | 7.242 | 7.423 | 7.489 |
| d24 | 9.023 | 9.622 | 9.782 |
| d31 | 13.299 | 12.700 | 12.541 |
| d36 | 218.379 | 369.918 | 457.250 |

Single lens data is shown below in Table 18.

TABLE 18

| Lens number | Focal length |
|---|---|
| L1 | 29.49 |
| L2, L3, L4 | −42.15 |
| L5 | 29.42 |
| L6 | −151.46 |
| L7 | 78.91 |
| L8 | −72.64 |
| L9 | 149.64 |
| L10 | 54.04 |
| L11 | −111.56 |
| L12, L13 | 92.40 |
| L14 | −26.58 |
| L15 | 55.45 |

Lens group data is shown below in Table 19.

TABLE 19

| Lens group | Focal length |
|---|---|
| G1 | 29.49 |
| G2 | 125.35 |
| G3 | 105.82 |
| G4 | 275.24 |

3. Drive Unit of Optical System

Figure 6:
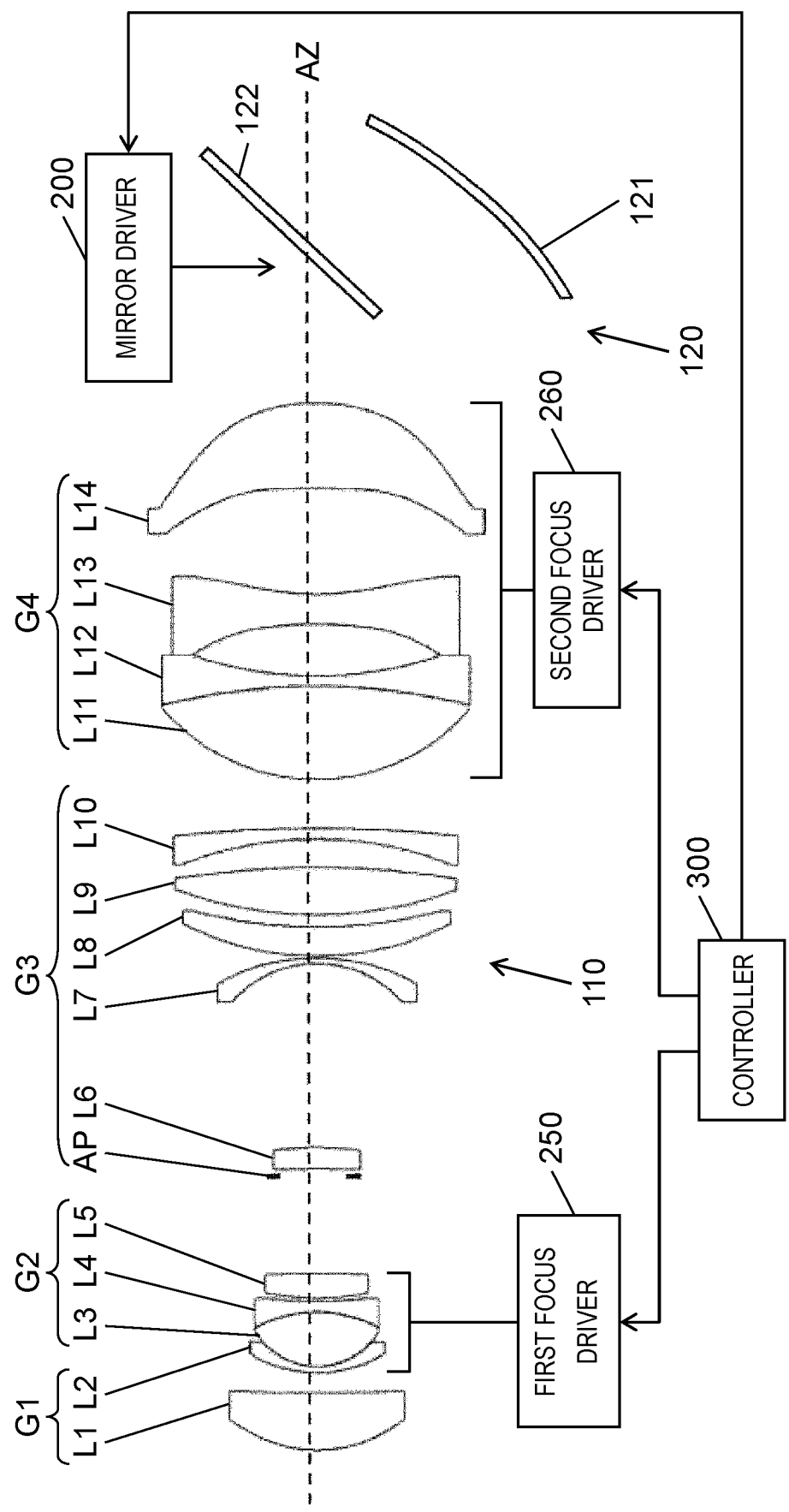
FIG. 6 is an explanatory view of a drive unit of an optical system in the image projection device according to the present disclosure.

FIG. 6 is an explanatory view of a drive unit for driving an optical system of image projection device 10 according to the present exemplary embodiment. As illustrated in FIG. 6, image projection device 10 includes mirror driver 200 that allows a parallel movement of second mirror 122, first focus driver 250 that drives second lens group G2, and second focus driver 260 that drives fourth lens group G4. Mirror driver 200 may rotate second mirror 122. First focus driver 250 and second focus driver 260 are focus adjustment mechanisms that move second lens group G2 and fourth lens group G4 respectively along optical axis AZ in order to achieve a focus function. Mirror driver 200, first focus driver 250, and second focus driver 260 are controlled by controller 300. Controller 300 is configured by a processor that executes a predetermined program to achieve a predetermined function, for example. Controller 300 may be a dedicated designed circuit. That is, controller 300 may be achieved by a central processing unit (CPU), a micro processing unit (MPU), a graphics processing unit (GPU), a field programmable gate array (FPGA), an application-specific integrated circuit (ASIC), and the like.

Figure 7:
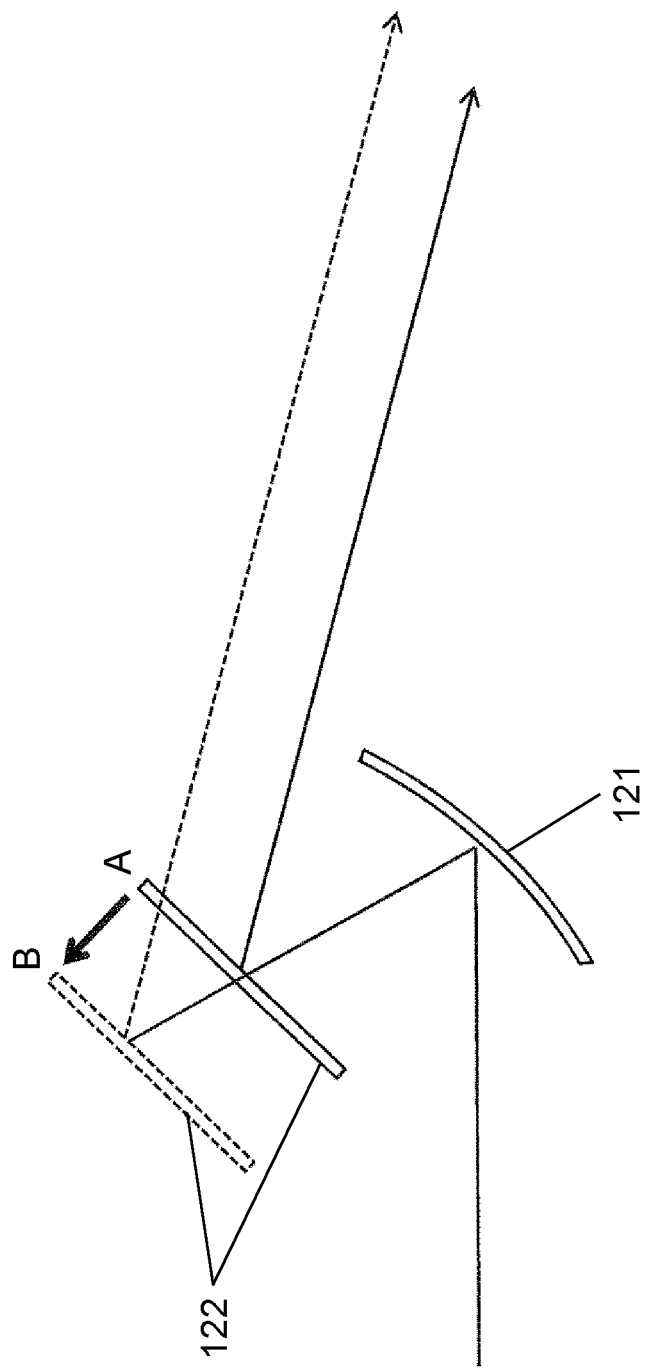
FIG. 7 is an explanatory view of a parallel movement of a second mirror.
Figure 8:
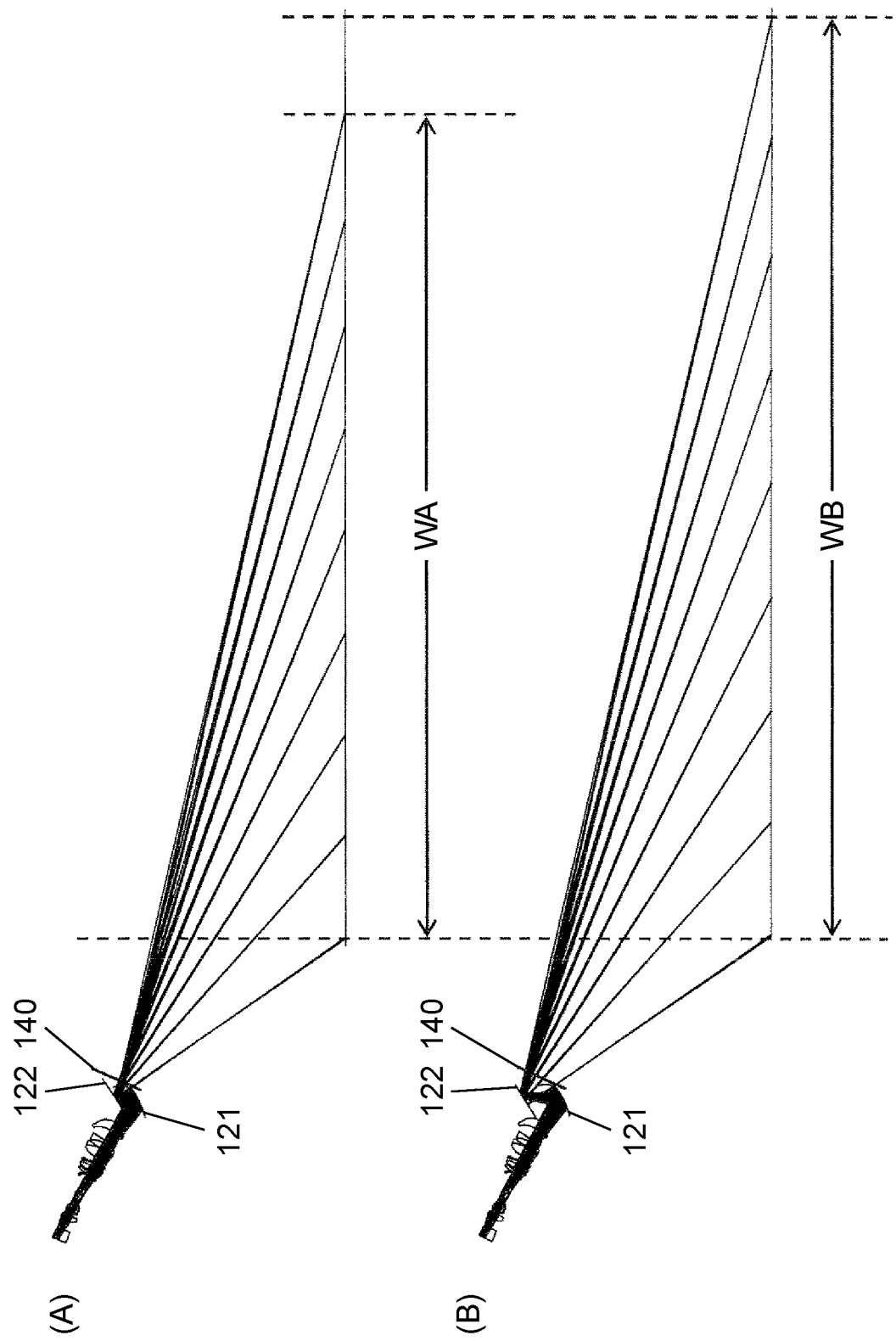
FIG. 8 is an explanatory view of a change in size of a projection image due to the parallel movement of the second mirror.

As second mirror 122 is moved in parallel to first mirror 121, an image to be projected is magnified or reduced. As second mirror 122 is rotated relative to first mirror 121, keystone correction is performed on an image to be projected. As illustrated in FIG. 7, for example, when second mirror 122 is moved in parallel to first mirror 121 from position A to position B so as to be separated from first mirror 121, an optical path of reflected light from second mirror 122 is changed. An image projection range is changed accordingly. FIG. 8A illustrates an image projection range when second mirror 122 is at position A. FIG. 8B illustrates an image projection range when second mirror 122 is at position B. By moving second mirror 122 from position A to position B, the image projection range is extended from WA to WB. Consequently, a zoom-up function is achieved.

FIG. 9 to FIG. 11B are explanatory views of specific configuration examples of mirror driver 200 that drives second mirror 122 in image projection device 10. Each mirror driver 200 includes parallel movement mechanism 210 that allows a parallel movement of second mirror 122 and rotating mechanism 230 that rotates second mirror 122.

Figure 9:
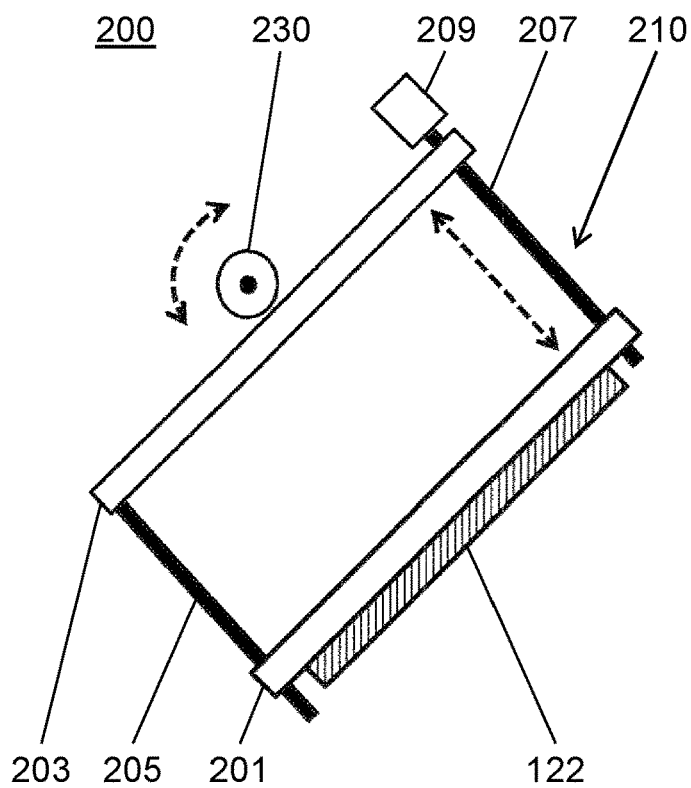
FIG. 9 illustrates a first configuration example of a mirror driver.

In mirror driver 200 illustrated in FIG. 9, parallel movement mechanism 210 includes first base 201 that holds second mirror 122, feed screw 207 that moves first base 201, motor 209 that rotates feed screw 207, guide pole 205, and second base 203 that supports guide pole 205. Rotating mechanism 230 includes a motor. As motor 209 rotates feed screw 207, first base 201 is moved straight along guide pole 205. At the same time, second mirror 122 held by first base 201 is also moved straight. In rotating mechanism 230, the motor is rotated to rotate second base 203. An angle of second mirror 122 can thus be changed.

Figure 10:
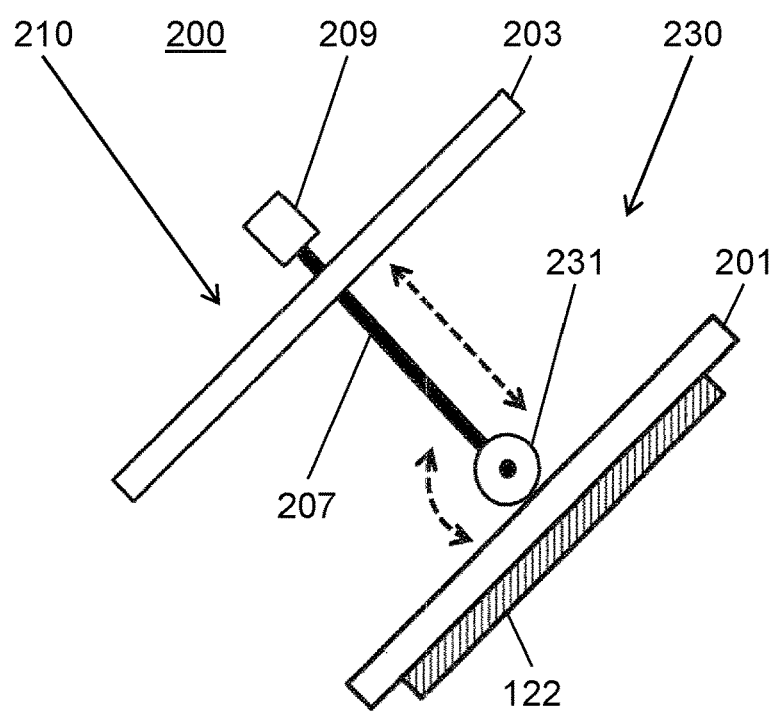
FIG. 10 illustrates a second configuration example of the mirror driver.

In mirror driver 200 illustrated in FIG. 10, parallel movement mechanism 210 includes feed screw 207, motor 209 that rotates feed screw 207, and second base 203 that supports feed screw 207. Rotating mechanism 230 includes first base 201 that holds second mirror 122 and motor 231 that rotates first base 201. Motor 231 is attached to a distal end of feed screw 207. In this configuration, as motor 209 rotates feed screw 207, first base 201 is moved straight. In addition, motor 231 is rotated to rotate second base 203.

Figure 11A:
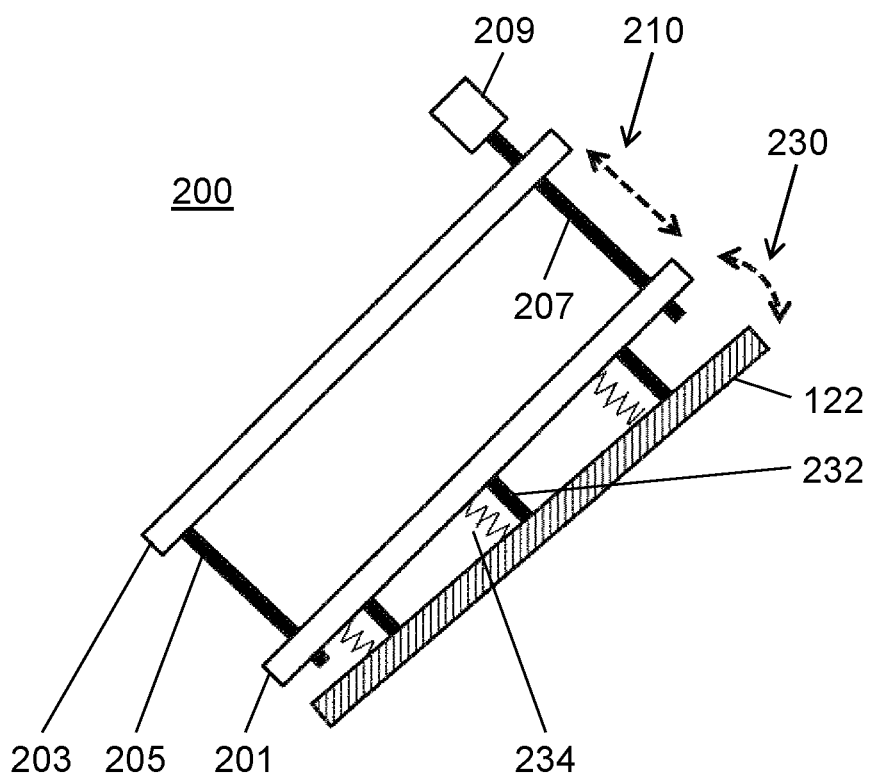
FIG. 11A illustrates a third configuration example of the mirror driver.
Figure 11B:
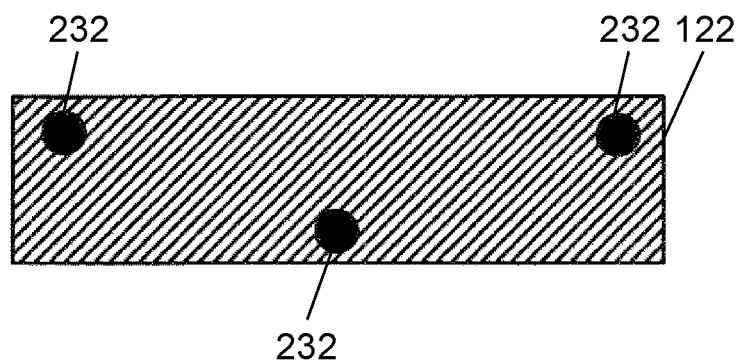
FIG. 11B illustrates the third configuration example of the mirror driver.

In mirror driver 200 illustrated in FIG. 11A, parallel movement mechanism 210 is basically the same as parallel movement mechanism 210 illustrated in FIG. 9. However, second mirror 122 is not directly attached to first base 201. Second mirror 122 is attached via telescopic members 232 and springs 234 to first base 201. Telescopic members 232 and springs 234 constitute rotating mechanism 230. Each telescopic member 232 receives a voltage to mechanically extend and contract, thus achieving a piezoelectric effect. Each telescopic member 232 may be configured by a piezoelectric element (piezo element), for example. As illustrated in FIG. 11B, second mirror 122 is supported via three telescopic members 232 by first base 201. In this configuration, as motor 209 rotates feed screw 207, first base 201 is moved straight. Furthermore, as three telescopic members 232 are extended and contracted as needed, the angle of second mirror 122 can be freely changed.

Mirrors 121, 122 are disposed in reflection optical system 120 such that optical axis AZ passes through a region on second mirror 122 where a ray is reflected at least some mirror positions in a movement range when a parallel movement of second mirror 122 is performed to achieve the zoom function. That is, optical axis AZ passes through a region where second mirror 122 reflects reflected light from first mirror 121. With such a configuration, the height of image projection device 10 can be reduced and downsizing of image projection device 10 can be achieved.

FIGS. 12A to 12D are explanatory views of influence on a projection image when a parallel movement of second mirror 122 is performed. In FIGS. 12B to 12D, a black star indicates a principal ray of a light beam that passes through the center of image display element 130 in the long-side direction to be projected on a projection surface nearest to image projection device 10.

The parallel movement of second mirror 122 allows a projection image to be changed in size as illustrated in FIGS. 12B to 12D. FIG. 12C illustrates a size of a projection image when second mirror 122 is at reference position C. When second mirror 122 is moved from reference position C to position B with a shorter distance to first mirror 121, as illustrated in FIG. 12B, the projection image is smaller in size than the projection image when second mirror 122 is at reference position C. On the other hand, when second mirror 122 is moved from reference position C to position D with a longer distance to first mirror 121, as illustrated in FIG. 12D, the projection image is larger in size than the projection image when second mirror 122 is at the reference position. As described above, with the parallel movement of second mirror 122, the projection image can be changed in size, that is, the zoom function is achieved.

FIGS. 13A to 13D are explanatory views of influence on the projection image when second mirror 122 is rotated. Rotation of second mirror 122 allows the projection image to be changed in shape as illustrated in FIGS. 13B to 13D. In FIG. 13A, a counter-clockwise direction is a positive direction of a rotating movement. FIG. 13C illustrates a projection image when second mirror 122 is at reference position (angle) C. The projection image is rectangular in this state. When second mirror 122 is rotated from the reference position in the positive direction, as illustrated in FIG. 13D, the projection image has a trapezoidal shape whose upper base is longer than a lower base. When second mirror 122 is rotated from the reference position in a negative direction, as illustrated in FIG. 13B, the projection image has a trapezoidal shape whose lower base is longer than an upper base. The rotation of second mirror 122 allows the shape of the projection image to be changed from a reference rectangular shape to a trapezoidal shape based on a rotating direction and an amount of rotation. That is, the rotation of second mirror 122 allows image distortion on a projection surface to be optically corrected. As illustrated in FIG. 14, center of rotation AR of second mirror 122 is set to be opposite to first mirror 121 with optical axis AZ of transmissive optical system 110 being provided between center of rotation AR and first mirror 121.

One of the parallel movement and the rotation of second mirror 122 may be performed, or both the parallel movement and the rotation may be performed simultaneously or sequentially. For example, mirror driver 200 may allow a parallel movement of second mirror 122 to perform zoom while keeping image distortion on the projection surface, and then may rotate second mirror 122 to correct the image distortion on the projection surface.

First focus driver 250 and second focus driver 260 move second lens group G2 and fourth lens group G4 respectively along optical axis AZ in a focus operation. First focus driver 250 and second focus driver 260 have a similar configuration to the parallel movement mechanism in mirror driver 200. When driving second mirror 122, controller 300 moves second lens group G2 and fourth lens group G4 (focus lenses) according to a movement of second mirror 122. That is, second mirror 122, second lens group G2, and fourth lens group G4 are driven at the same time. However, if high optical performance is maintained on a projection surface, second lens group G2 and fourth lens group G4 do not need to be driven at the same time. When driving second mirror 122, controller 300 may move one of focus lens groups according to the movement of second mirror 122.

Figure 15:
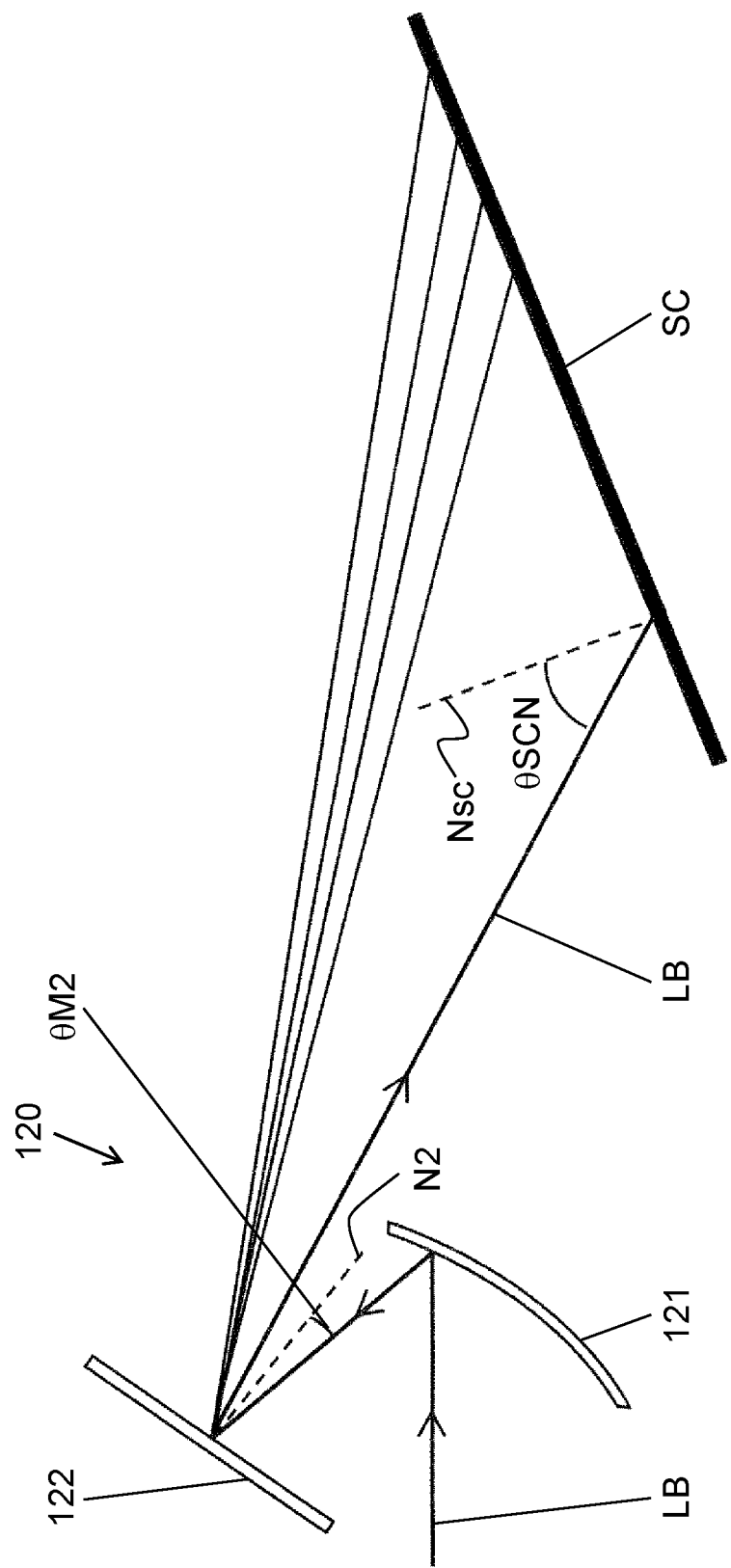
FIG. 15 is an explanatory view of incident angles of rays on the second mirror and on a projection surface.

FIG. 15 is an explanatory view of a relative relationship between second mirror 122 and a projection surface (surface of screen SC). First mirror 121 and second mirror 122 are preferably disposed such that an incident angle of principal ray LB satisfies the following relationship.

$$|\theta M2| < |\theta SCN| \tag{10}$$

wherein principal ray LB is a principal ray of a light beam that passes through the center of image display element 130 in the long-side direction to be projected on screen SC closest to image projection device 10. θM2 denotes an incident angle of principal ray LB with respect to normal line N2 of second mirror 122. θSCN denotes an incident angle of principal ray LB with respect to normal line Nsc of screen SC. That is, in using image projection device 10, the mirrors are preferably disposed in reflection optical system 120 such that a reflecting surface of second mirror 122 is not parallel to screen SC. θM2, θSCN are set to the following values.

TABLE 20

|  | θM2 | θSCN |
| --- | --- | --- |
| First example | 2.1 | 34.9 |
| Second example | 2.0 | 34.8 |
| Third example | 2.2 | 32.0 |

By satisfying the expression (10), it is possible to project an image on screen SC without a ray being blocked by first mirror 121. That is, it is possible to achieve downsizing (height reduction) of reflection optical system 120 while optical performance is maintained.

FIG. 16 is an explanatory view of a relative relationship between first mirror 121 and second mirror 122. First mirror 121 and second mirror 122 are preferably disposed such that the incident angle of principal ray LB satisfies the following relationship.

$$0 < |\theta M1| - |\theta M2| < 30 \tag{11}$$

wherein principal ray LB is the principal ray of the light beam that passes through the center of image display element 130 in the long-side direction to be projected on screen SC closest to image projection device 10. θM1 denotes an incident angle of principal ray LB with respect to normal line N1 of first mirror 121 at a position where principal ray LB is reflected by first mirror 121. θM2 denotes an incident angle of principal ray LB with respect to normal line N2 of second mirror 122 at a position where principal ray LB reflected by first mirror 121 is reflected by second mirror 122.

The expression (11) is a condition for achieving downsizing of reflection optical system 120 constituted by first mirror 121 and second mirror 122 while good optical performance is maintained. When |θM1|−|θM2| is less than a lower limit value of the expression (11), the region of a ray emitted from image display element 130 and reflected by second mirror 122 is widened. This condition is a disadvantageous arrangement condition for achieving downsizing of reflection optical system 120. On the other hand, when |θM1|−|θM2| exceeds an upper limit value of the expression (11), a part of the ray emitted from image display element 130 and reflected by second mirror 122 is blocked by a part of first mirror 121 before reaching screen SC. It is thus impossible to reproduce an image on image display element 130 completely on screen SC. The light blocked by first mirror 121 becomes stray light, and the stray light is formed into a ghost image. The ghost image degrades quality of a projection image.

By further satisfying the following conditional expression (11b), the effect described above can be more enhanced.

$$5 < |\theta M1| - |\theta M2| < 25 \quad (11b)$$

By further satisfying the following conditional expression (11c), the effect described above can be more enhanced.

$$10 < |\theta M1| - |\theta M2| < 20 \quad (11c)$$

By further satisfying the following conditional expression (11d), the effect described above can be more enhanced.

$$12.5 < |\theta M1| - |\theta M2| < 17.5 \quad (11d)$$

Values of |θM1|−|θM2| are as follows, for example.

TABLE 21

|  | First example | Second example | Third example |
|---|---|---|---|
| |θM1| − |θM2| | 15.42 | 15.35 | 13.43 |

4. Effects and Others

As described above, image projection device 10 according to the present exemplary embodiment is a device for projecting an image on screen SC. Image projection device 10 includes image display element 130 that forms a projection image, transmissive optical system 110 that is disposed on an emission surface side of image display element 130 and includes aperture diaphragm AP and a plurality of lenses, and reflection optical system 120 that includes first mirror 121 that has positive power and reflects light emitted from transmissive optical system 110 and second mirror 122 that is a plane mirror for reflecting light reflected by the first mirror on a projection surface. First mirror 121 is disposed between second mirror 122 and screen SC in direction D along optical axis AZ of transmissive optical system 110.

With the configuration described above, an intermediate image is formed between the transmissive optical system and the first mirror and thus downsizing of the image projection device can be achieved.

The image projection device may further include mirror driver 200 that allows a parallel movement of second mirror 122. With the parallel movement of second mirror 122, a zoom function for a projection image can be achieved.

The image projection device may further include mirror driver 200 that rotatably moves second mirror 122. Distortion of the projection image can thus be corrected.

Other Exemplary Embodiments

The exemplary embodiment has been described above to exemplify the technique disclosed in the present application. However, the technique in the present disclosure is not limited to the exemplary embodiment, and is also applicable to exemplary embodiments subjected to changes, replacements, additions, omissions, or the like. Further, the components described in the above exemplary embodiment can be combined to configure a new exemplary embodiment.

For example, while the configuration of mirror driver 200 has been described with reference to FIG. 9 to FIG. 11B in the exemplary embodiment, the configuration example of mirror driver 200 is not limited to the configuration described above. Any configuration that allows a parallel movement and/or a rotation of second mirror 122 is applicable.

Note that the exemplary embodiment described above is provided to exemplify the technique in the present disclosure. Therefore, it is possible to make various changes, replacements, additions, omissions, and the like within the scope of the claims and equivalents thereof.

INDUSTRIAL APPLICABILITY

The present disclosure is applicable to a projection for projecting an image displayed on an image display element. Specifically, the present disclosure is applicable to a projector, a head-up display, and the like.

REFERENCE MARKS IN THE DRAWINGS

10: image projection device
100: projection optical system
110: transmissive optical system
120: reflection optical system
121: first mirror
122: second mirror
130: image display element
140: transmissive element
200: mirror driver
250: first focus driver
260: second focus driver
300: controller
AP: aperture diaphragm
AZ: optical axis
AR: center of rotation
LB: principal ray
PB: prism
SC: screen

The invention claimed is:
1. An image projection device for projecting an image on a projection surface, the image projection device comprising:

an image display element that forms a projection image;
a transmissive optical system that is disposed on an emission surface side of the image display element and includes a diaphragm and a plurality of lenses;
a reflection optical system that includes a first mirror and a second mirror, the first mirror reflecting light emitted from the transmissive optical system and having positive power, the second mirror being a plane mirror for reflecting light reflected by the first mirror onto the projection surface; and
a mirror driver that drives the second mirror to move in parallel relative to the first mirror along a normal direction of a reflection surface of the second mirror, wherein
the first mirror is disposed between the second mirror and the projection surface in a direction of an optical axis of the transmissive optical system,
a reflecting surface of the second mirror is not parallel to the projection surface, and
an intermediate image is formed between the transmissive optical system and the first mirror.

2. The image projection device according to claim 1, wherein the reflection optical system satisfies a following relational expression, $$0 < TL/ft < 10$$

where
ft denotes a focal length of the transmissive optical system, and
TL denotes a distance parallel to an optical axis that is from a position where a principal ray of a light beam is reflected by the first mirror to the image display element, the light beam passing through a center of the image display element in a long-side direction and being projected on the closest projection surface to the image projection device.

3. The image projection device according to claim 1, wherein the reflection optical system satisfies a following relational expression, $$|\theta M2| < |\theta SCN|$$

where
θM2 denotes an incident angle of a principal ray of a light beam with respect to a normal line of the second mirror, the light beam passing through a center of the image display element in a long-side direction and being projected on the closest projection surface to the image projection device, and
θSCN denotes an incident angle of the principal ray with respect to a normal line of the projection surface.

4. The image projection device according to claim 1, wherein the reflection optical system satisfies a following relational expression, $$0 < |\theta M1| - |\theta M2| < 30$$

where
θM1 denotes an incident angle of a principal ray of a light beam with respect to a normal line of the first mirror at a position where the principal ray is reflected by the first mirror, the light beam passing through a center of the image display element in a long-side direction and being projected on the closest projection surface to the image projection device, and
θM2 denotes an incident angle of the principal ray with respect to a normal line of the second mirror at a position where the principal ray reflected by the first mirror is reflected by the second mirror.

5. The image projection device according to claim 1, wherein the optical axis of the transmissive optical system passes through the projection surface.

6. The image projection device according to claim 1, wherein the projection surface is not parallel to a display surface of the image display element.

7. The image projection device according to claim 1, wherein the mirror driver drives the second mirror to move in parallel and then drives the second mirror to rotate.

8. The image projection device according to claim 1, wherein the reflecting surface of the second mirror is not parallel to the projection surface.

9. The image projection device according to claim 1, further comprising a focus driver that drives the plurality of lenses to achieve focus adjustment.

10. The image projection device according to claim 9, wherein the mirror driver drives the second mirror in accordance with the focus driver.

11. The image projection device according to claim 1, wherein the reflection optical system is disposed to cause the optical axis of the transmissive optical system to pass through a region on the second mirror where a ray is reflected at least some mirror positions in a movement range when a parallel movement of the second mirror is performed.

12. The image projection device according to claim 1, wherein a center of rotation of the second mirror is set to be opposite to the first mirror with the optical axis of the transmissive optical system.

13. An image projection device for projecting an image on a projection surface, the image projection device comprising:
an image display element that forms a projection image;
a transmissive optical system that is disposed on an emission surface side of the image display element and includes a diaphragm and a plurality of lenses;
a reflection optical system that includes a first mirror and a second mirror, the first mirror reflecting light emitted from the transmissive optical system and having positive power, the second mirror being a plane mirror for reflecting light reflected by the first mirror onto the projection surface; and
a mirror driver that drives the second mirror to rotate, wherein
the first mirror is disposed between the second mirror and the projection surface in a direction of an optical axis of the transmissive optical system,
a reflecting surface of the second mirror is not parallel to the projection surface, and
an intermediate image is formed between the transmissive optical system and the first mirror.

14. The image projection device according to claim 13, wherein the reflection optical system satisfies a following relational expression, $$0 < TL/ft < 10$$

where
ft denotes a focal length of the transmissive optical system, and
TL denotes a distance parallel to an optical axis that is from a position where a principal ray of a light beam is reflected by the first mirror to the image display element, the light beam passing through a center of the image display element in a long-side direction and being projected on the closest projection surface to the image projection device.

15. The image projection device according to claim 13, wherein the reflection optical system satisfies a following relational expression, $$|\theta M2| < |\theta SCN|$$

where

θM2 denotes an incident angle of a principal ray of a light beam with respect to a normal line of the second mirror, the light beam passing through a center of the image display element in a long-side direction and being projected on the closest projection surface to the image projection device, and θSCN denotes an incident angle of the principal ray with respect to a normal line of the projection surface.

16. The image projection device according to claim 13, wherein the reflection optical system satisfies a following relational expression, $$0 < |\theta M1| - |\theta M2| < 30$$

where

θM1 denotes an incident angle of a principal ray of a light beam with respect to a normal line of the first mirror at a position where the principal ray is reflected by the first mirror, the light beam passing through a center of the image display element in a long-side direction and being projected on the closest projection surface to the image projection device, and θM2 denotes an incident angle of the principal ray with respect to a normal line of the second mirror at a position where the principal ray reflected by the first mirror is reflected by the second mirror.

\* \* \* \* \*